(12) United States Patent
Chhatriwala et al.

(10) Patent No.: US 8,867,511 B2
(45) Date of Patent: Oct. 21, 2014

(54) SYSTEM AND METHOD FOR REDUCING RESETS DURING HANDOVERS IN A SINGLE FREQUENCY DUAL CARRIER WIRELESS COMMUNICATION SYSTEM

(75) Inventors: Murtuza T. Chhatriwala, San Diego, CA (US); Srinivasa R. Eravelli, San Diego, CA (US); Hailiang Cai, San Diego, CA (US); Sumanth Govindappa, San Diego, CA (US); Liang Zhang, San Diego, CA (US); Sivaram S. Palakodety, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 228 days.

(21) Appl. No.: 13/315,244

(22) Filed: Dec. 8, 2011

(65) Prior Publication Data

US 2012/0147869 A1    Jun. 14, 2012

Related U.S. Application Data

(60) Provisional application No. 61/421,318, filed on Dec. 9, 2010.

(51) Int. Cl.
*H04W 80/02* (2009.01)
*H04W 36/06* (2009.01)
*H04W 28/06* (2009.01)
*H04L 1/18* (2006.01)
*H04L 1/00* (2006.01)
*H04W 36/02* (2009.01)

(52) U.S. Cl.
CPC .......... *H04W 28/065* (2013.01); *H04L 1/1841* (2013.01); *H04L 2001/0092* (2013.01); *H04W 36/06* (2013.01); *H04W 80/02* (2013.01); *H04W 36/02* (2013.01)

USPC ......................................................... 370/338

(58) Field of Classification Search
CPC ... H04W 28/065; H04W 36/02; H04W 36/06; H04W 80/02; H04L 1/1841; H04L 2001/0092
See application file for complete search history.

(56) References Cited

U.S. PATENT DOCUMENTS

2008/0186946 A1*  8/2008  Marinier et al. .............. 370/349
2008/0188220 A1   8/2008  DiGirolamo et al.
(Continued)

FOREIGN PATENT DOCUMENTS

WO    2004025842 A2    3/2004

OTHER PUBLICATIONS

Ericsson, ST Ericsson, "Event Handling at PCC change", 3GPP TSG-RAN WG2 #69bis, Tdoc R2-101996, Beijing, China, Apr. 12-16, 2010.*

(Continued)

*Primary Examiner* — Joseph Bednash
(74) *Attorney, Agent, or Firm* — Darren M. Simon

(57) ABSTRACT

A method, apparatus, and computer program product can provide for procedures at an access terminal for handling the delivery of packets from the MAC entity to the RLC entity, with an aim to reduce the occurrence of RLC resets that might otherwise be caused by out-of-order processing of control packets following a serving cell change. In one example, a MAC entity may insert an identifier into a packet delivered up to the RLC entity, to indicate whether the packet arrived from the current primary serving cell. In another example, a serving cell change procedure may include steps to flush a queue at the MAC entity and kill any running reordering release timers. In these ways potential problems caused by out-of-order control packets can be reduced or avoided.

12 Claims, 12 Drawing Sheets

(56) References Cited

U.S. PATENT DOCUMENTS

| | | | |
|---|---|---|---|
| 2008/0188224 | A1 | 8/2008 | Pani et al. |
| 2011/0002262 | A1 | 1/2011 | Wang et al. |
| 2011/0064053 | A1 | 3/2011 | Cha et al. |
| 2011/0116466 | A1 | 5/2011 | Chang et al. |
| 2011/0149997 | A1 | 6/2011 | Yi et al. |
| 2012/0140743 | A1* | 6/2012 | Pelletier et al. ............... 370/335 |

OTHER PUBLICATIONS

CATT, "PCC Change", 3GPP TSG-RAN WG2 #69bis, R2-102061, Beijing, China, Apr. 12-16, 2010.*

Motorola, "Change of Primary Component Carrier", 3GPP TSG-RAN WG2#69bis, R2-102346, Beijing, China, Apr. 12-16, 2010.*

Huawei, "HS-PDSCH Serving Cell Change Enhancements", 3GPP TSG-RAN WG2 #62bis, R2-083531, Jun. 30-Jul. 4, 2008, Warsaw Poland.*

Bergman J et al., "Continued HSPAEvolution of mobile broadband",Ericsson Review, Jan. 28, 2009, pp. 7-11, XP002671933, Retrieved from the Internet: URL:http://www.ericsson.com/res/thecompany/docs/publications/ericsson_review/2009/issue1/hspa.pdf [retrieved on Feb. 21, 2012]p. 10.

International Search Report and Written Opinion—PCT/US2011/064137—ISAEPO—Mar. 30, 2012.

Qualcomm Europe: "RAN2 Specification Impact from DC HSDPA with Joint Node B Queue", 3GPP Draft; R2-083574, 3rd Generation Partnership Project (3GPP), Mobile Competence Centre ; 650, Route Des Lucioles ; F-06921 Sophia-Antipolis Cedex ; France, vol. RAN WG2, no. Warsaw, Poland; 20080624, Jun. 24, 2008, XP050140944, [retrieved on Jun. 24, 2008] the whole document.

Alcatel-Lucent, Alcatel-Lucent Shanghai Bell, "Discussion on SFDC-HSDPA," R1-104383, 3GPP TSG-RAN WG1 Meeting #62, Madrid, Spain, Aug. 23-27, 2010.

* cited by examiner

SYSTEM AND METHOD FOR REDUCING RESETS DURING HANDOVERS IN A SINGLE FREQUENCY DUAL CARRIER WIRELESS COMMUNICATION SYSTEM

CROSS-REFERENCE TO RELATED APPLICATIONS

This application claims priority to and the benefit of provisional patent application No. 61/421,318, titled, "SYSTEM AND METHOD FOR REDUCING RESETS DURING HANDOVERS IN A SINGLE FREQUENCY DUAL CARRIER WIRELESS COMMUNICATION SYSTEM," filed in the United States Patent and Trademark Office on Dec. 9, 2010, the entire content of which is incorporated herein by reference.

BACKGROUND

1. Field

Aspects of the present disclosure relate generally to wireless communication systems, and more particularly, to handovers in cellular wireless communication systems.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSDPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications.

As an example, multi-point HSDPA has been recently introduced, in which multiple cells can provide high-speed downlinks within the same carrier frequency to a mobile station, such that the mobile station is capable of aggregating the transmissions from those cells. In some of these systems, an access terminal can include multiple MAC entities, each one configured to receive and process a respective one of the downlink transmissions. Here, because each MAC entity acts largely independently of the other MAC entities at the access terminal, certain issues can arise when the MAC entities deliver packets to higher layers. That is, the packets may be in the correct order as far as the MAC entity is concerned, but the combined order of packets coming from multiple MAC entities may be out of order. In particular, when a serving cell change occurs changing which cell is providing data to the respective MAC entities, certain issues can arise with the out-of-order packets at the higher layers, potentially causing a reset, e.g., at the RLC layer, when control packets are processed out of order.

Therefore, there is a desire in the field to improve the handling of packets by access terminals including multiple MAC entities to reduce potential issues caused by out-of-order packets.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure, nor to delineate the scope of any or all aspects of the disclosure. Its sole purpose is to present some concepts of one or more aspects of the disclosure in a simplified form as a prelude to the more detailed description that is presented later.

Various aspects of the present disclosure provide for a system, a method, a computer program, and an access terminal capable of handling the delivery of packets from a MAC entity to an RLC entity at the access terminal, with an aim to reduce the occurrence of RLC resets that might otherwise be caused by out-of-order processing of control packets following a serving cell change. In one example, the MAC entity may insert an identifier into a packet delivered up to the RLC entity, to indicate whether the packet arrived from the current primary serving cell. In another example, a serving cell change procedure may include steps to flush a queue at the MAC entity and kill any running reordering release timers. In these ways potential problems caused by out-of-order control packets can be reduced or avoided.

In one aspect, the disclosure provides a method of wireless communication operable at an access terminal. Here, the method includes receiving a packet at a MAC entity from a first serving cell, delivering the packet to an RLC layer, and inserting an identifier into the packet, the identifier adapted to indicate whether the first serving cell is a current primary serving cell at the time of the delivering of the packet to the RLC layer.

Another aspect of the disclosure provides a method of wireless communication operable at an access terminal, including receiving a downlink channel from each of a plurality of cells, where the plurality of cells includes a first cell as a primary serving cell. The method further includes performing a serving cell change such that a second cell replaces the first cell as the primary serving cell, wherein the performing of the serving cell change comprises flushing a MAC queue corresponding to the first cell.

Another aspect of the disclosure provides an access terminal that includes an RLC entity for processing an RLC packet and a first MAC entity for receiving a first downlink channel comprising a plurality of MAC packets, reordering the plurality of MAC packets to form the RLC packet, and delivering the RLC packet to the RLC entity. Here, the first MAC entity is configured to flush a MAC queue at the time of a serving cell change that changes which cell acts as a primary serving cell.

Another aspect of the disclosure provides a method of wireless communication operable at an access terminal, including receiving a downlink channel from each of a plurality of cells, the plurality of cells comprising a first cell as a primary serving cell; performing a serving cell change such that a second cell replaces the first cell as the primary serving cell; starting a delay timer corresponding to the serving cell change, the delay timer having a delay value corresponding to a value of a T1 reordering release timer; receiving an RLC control packet from the second cell; and processing the RLC control packet at an RLC layer after the delay timer expires.

Another aspect of the disclosure provides a method of wireless communication operable at an access terminal. Here, the method includes receiving a downlink channel from each of a plurality of cells, where the plurality of cells includes a first cell as a primary serving cell. The method further includes receiving a first control packet from the first cell, queuing the first control packet at a first MAC entity corresponding to the first cell during a running of a reordering release timer, performing a serving cell change such that a second cell replaces the first cell as the primary serving cell, receiving a second control packet from the second cell and delivering the second control packet to an RLC entity, delivering the first control packet to the RLC entity at an expiration of the reordering release timer, after the delivering of the second control packet to the RLC entity, and discarding the first control packet corresponding to a determination that the first control packet comprises an out-of-order control packet.

Another aspect of the disclosure provides an access terminal configured for wireless communication. Here, the access terminal includes at least one processor, a receiver coupled to the at least one processor for receiving a downlink transmission, and a memory coupled to the at least one processor. The at least one processor is configured to receive a packet at a MAC entity from a first serving cell, to deliver the packet to an RLC layer, and to insert an identifier into the packet, the identifier adapted to indicate whether the first serving cell is a current primary serving cell at the time of the delivering of the packet to the RLC layer.

Another aspect of the disclosure provides an access terminal configured for wireless communication, including at least one processor, a receiver coupled to the at least one processor for receiving a downlink transmission, and a memory coupled to the at least one processor. Here, the at least one processor is configured to receive a downlink channel from each of a plurality of cells, the plurality of cells comprising a first cell as a primary serving cell, and to perform a serving cell change such that a second cell replaces the first cell as the primary serving cell, wherein the performing of the serving cell change comprises flushing a MAC queue corresponding to the first cell.

Another aspect of the disclosure provides an access terminal configured for wireless communication, including at least one processor, a receiver coupled to the at least one processor for receiving a downlink transmission, and a memory coupled to the at least one processor. Here, the at least one processor is configured to receive a downlink channel from each of a plurality of cells, the plurality of cells comprising a first cell as a primary serving cell, to perform a serving cell change such that a second cell replaces the first cell as the primary serving cell, to start a delay timer corresponding to the serving cell change, the delay timer having a delay value corresponding to a value of a T1 reordering release timer, to receive an RLC control packet from the second cell, and to process the RLC control packet at an RLC layer after the delay timer expires.

Another aspect of the disclosure provides an access terminal configured for wireless communication, including at least one processor, a receiver coupled to the at least one processor for receiving a downlink transmission, and a memory coupled to the at least one processor. Here, the at least one processor is configured to receive a downlink channel from each of a plurality of cells, the plurality of cells comprising a first cell as a primary serving cell, to receive a first control packet from the first cell, to queue the first control packet at a first MAC entity corresponding to the first cell during a running of a reordering release timer, to perform a serving cell change such that a second cell replaces the first cell as the primary serving cell, to receive a second control packet from the second cell and delivering the second control packet to an RLC entity, to deliver the first control packet to the RLC entity at an expiration of the reordering release timer, after the delivering of the second control packet to the RLC entity, and to discard the first control packet corresponding to a determination that the first control packet comprises an out-of-order control packet.

Another aspect of the disclosure provides an access terminal configured for wireless communication, which includes means for receiving a packet at a MAC entity from a first serving cell, means for delivering the packet to an RLC layer and means for inserting an identifier into the packet, where the identifier is adapted to indicate whether the first serving cell is a current primary serving cell at the time of the delivering of the packet to the RLC layer.

Another aspect of the disclosure provides an access terminal configured for wireless communication, which includes means for receiving a downlink channel from each of a plurality of cells, where the plurality of cells includes a first cell as a primary serving cell, and means for performing a serving cell change such that a second cell replaces the first cell as the primary serving cell. Here, the performing of the serving cell change comprises flushing a MAC queue corresponding to the first cell.

Another aspect of the disclosure provides an access terminal configured for wireless communication, which includes means for receiving a downlink channel from each of a plurality of cells, the plurality of cells comprising a first cell as a primary serving cell, means for performing a serving cell change such that a second cell replaces the first cell as the primary serving cell, means for starting a delay timer corresponding to the serving cell change, the delay timer having a delay value corresponding to a value of a T1 reordering release timer, means for receiving an RLC control packet from the second cell, and means for processing the RLC control packet at an RLC layer after the delay timer expires.

Another aspect of the disclosure provides an access terminal configured for wireless communication, which includes means for receiving a downlink channel from each of a plurality of cells, the plurality of cells comprising a first cell as a primary serving cell, means for receiving a first control packet from the first cell, means for queuing the first control packet at a first MAC entity corresponding to the first cell during a running of a reordering release timer, means for performing a serving cell change such that a second cell replaces the first cell as the primary serving cell, means for receiving a second control packet from the second cell and delivering the second control packet to an RLC entity, means for delivering the first control packet to the RLC entity at an expiration of the reordering release timer, after the delivering of the second control packet to the RLC entity, and means for discarding the first control packet corresponding to a determination that the first control packet comprises an out-of-order control packet.

Another aspect of the disclosure provides a computer program product operable at an access terminal, including a computer-readable medium having instructions for causing a computer to receive a packet at a MAC entity from a first serving cell, instructions for causing a computer to deliver the packet to an RLC layer, and instructions for causing a computer to insert an identifier into the packet, the identifier adapted to indicate whether the first serving cell is a current primary serving cell at the time of the delivering of the packet to the RLC layer.

Another aspect of the disclosure provides a computer program product operable at an access terminal, including a computer-readable medium having instructions for causing a computer to receive a downlink channel from each of a plurality of cells, the plurality of cells comprising a first cell as a primary serving cell, and instructions for causing a computer to perform a serving cell change such that a second cell replaces the first cell as the primary serving cell, wherein the performing of the serving cell change includes flushing a MAC queue corresponding to the first cell.

Another aspect of the disclosure provides a computer program product operable at an access terminal, including a computer-readable medium having instructions for causing a computer to receive a downlink channel from each of a plurality of cells, the plurality of cells comprising a first cell as a primary serving cell, instructions for causing a computer to perform a serving cell change such that a second cell replaces the first cell as the primary serving cell, instructions for causing a computer to start a delay timer corresponding to the serving cell change, the delay timer having a delay value corresponding to a value of a T1 reordering release timer, instructions for causing a computer to receive an RLC control packet from the second cell, and instructions for causing a computer to process the RLC control packet at an RLC layer after the delay timer expires.

Another aspect of the disclosure provides a computer program product operable at an access terminal, including a computer-readable medium having instructions for causing a computer to receive a downlink channel from each of a plurality of cells, the plurality of cells comprising a first cell as a primary serving cell, instructions for causing a computer to receive a first control packet from the first cell, instructions for causing a computer to queue the first control packet at a first MAC entity corresponding to the first cell during a running of a reordering release timer, instructions for causing a computer to perform a serving cell change such that a second cell replaces the first cell as the primary serving cell, instructions for causing a computer to receive a second control packet from the second cell and delivering the second control packet to an RLC entity, instructions for causing a computer to deliver the first control packet to the RLC entity at an expiration of the reordering release timer, after the delivering of the second control packet to the RLC entity, and instructions for causing a computer to discard the first control packet corresponding to a determination that the first control packet comprises an out-of-order control packet.

These and other aspects of the invention will become more fully understood upon a review of the detailed description, which follows.

DETAILED DESCRIPTION

Figure 1:
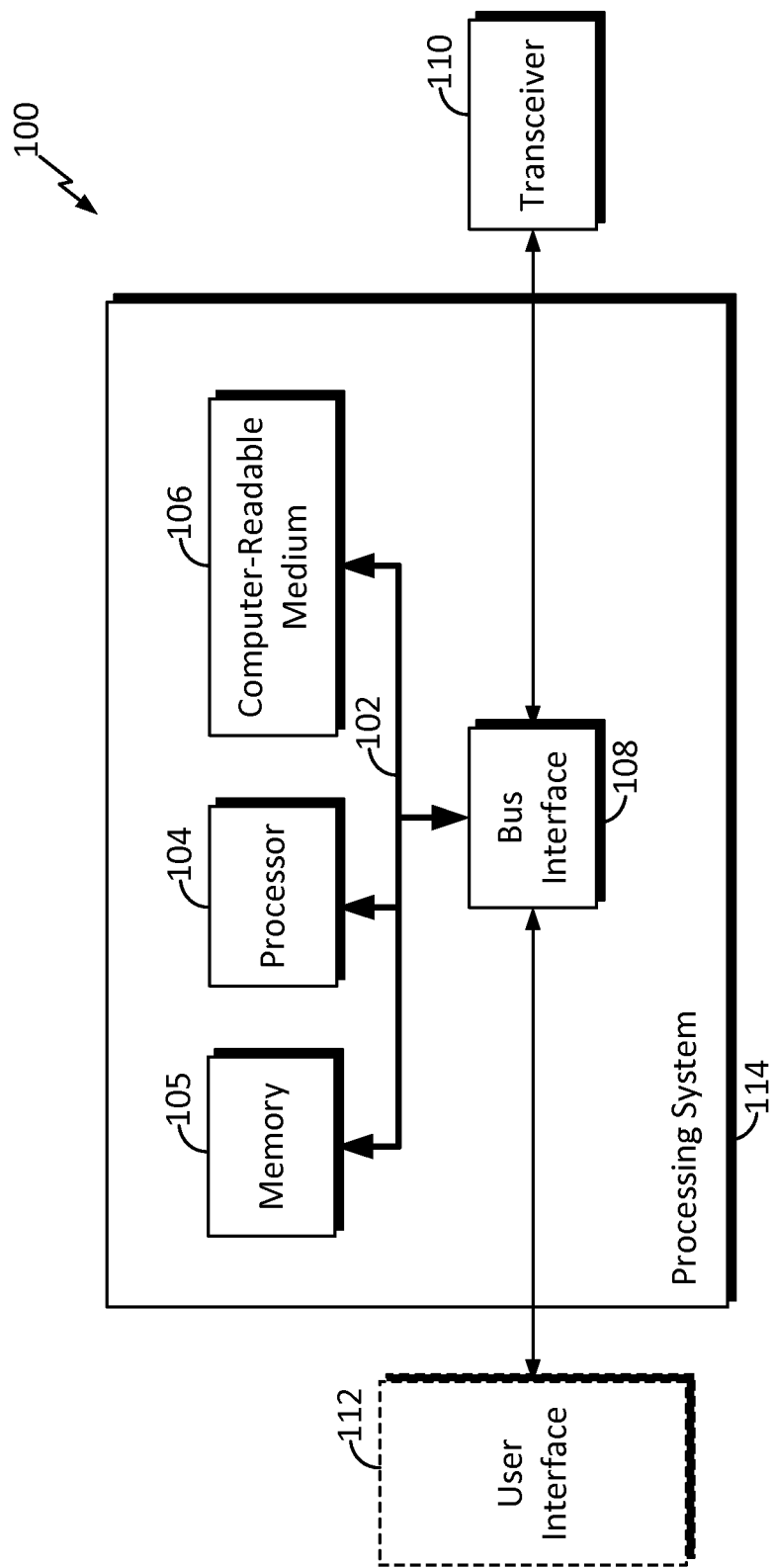
FIG. 1 is a diagram illustrating an example of a hardware implementation for an apparatus employing a processing system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Some aspects of the present disclosure provide for procedures at an access terminal for handling the delivery of packets from the MAC entity to the RLC entity, with an aim to reduce the occurrence of RLC resets that might otherwise be caused by out-of-order processing of control packets following a serving cell change.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure.

One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. Here, "medium" may include any media that facilitates transfer of a computer program from one place to another. As an example, the software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

FIG. 1 is a conceptual diagram illustrating an example of a hardware implementation for an apparatus 100 employing a processing system 114. In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, a memory 105, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

Figure 2:
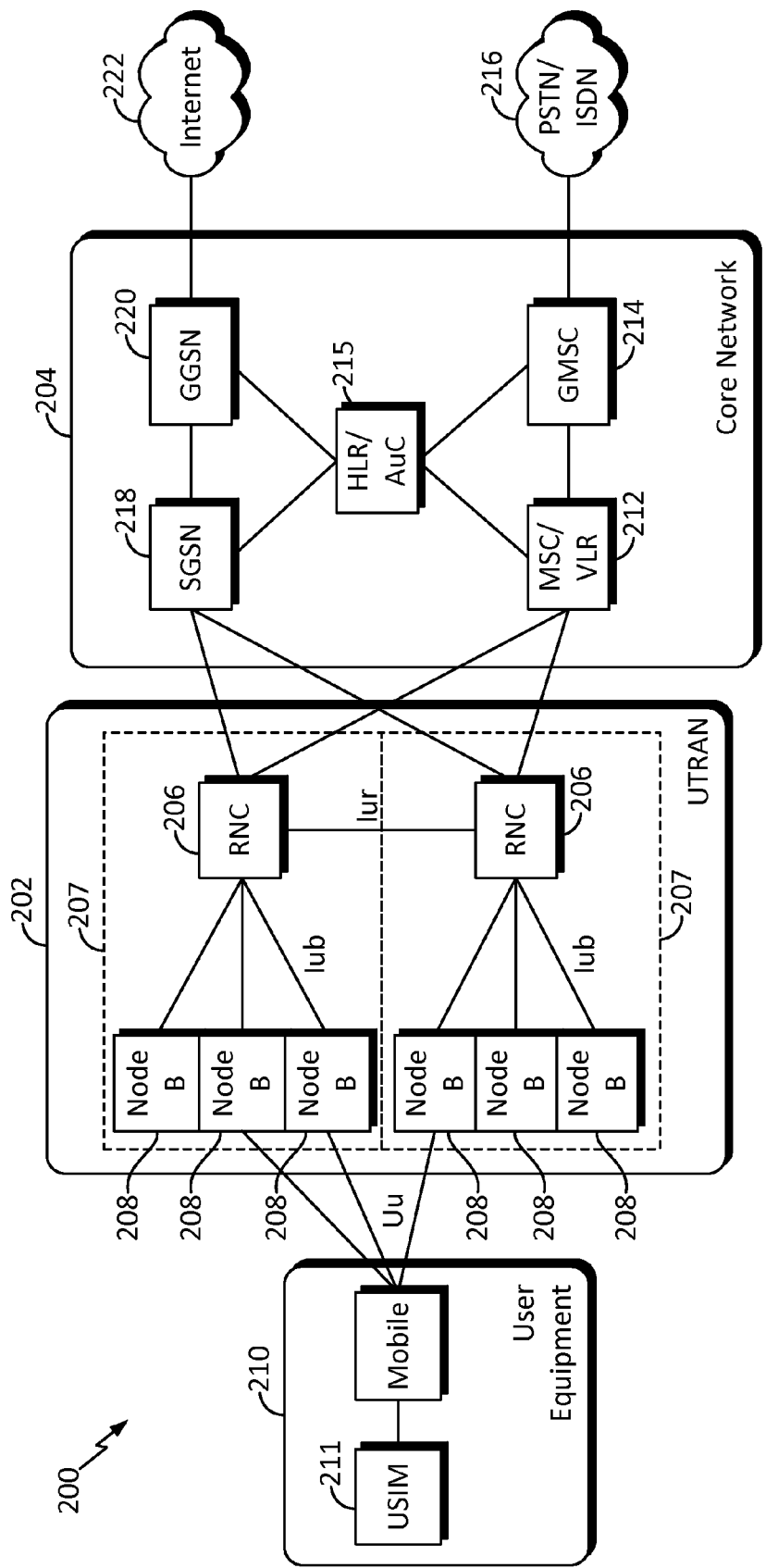
FIG. 2 is a block diagram conceptually illustrating an example of a telecommunications system.

The various concepts presented throughout this disclosure may be implemented across a broad variety of telecommunication systems, network architectures, and communication standards. By way of example and without limitation, aspects of the present disclosure illustrated in FIG. 2 are presented with reference to a UMTS system 200 employing a W-CDMA air interface. A UMTS network includes three interacting domains: a core network 204, a UMTS terrestrial radio access network (UTRAN) 202, and user equipment (UE) 210. In this example, the UTRAN 202 may provide various wireless services including telephony, video, data, messaging, broadcasts, and/or other services. The UTRAN 202 may include a plurality of radio network subsystems (RNSs) such as an RNS 207, each controlled by a respective radio network controller (RNC) such as an RNC 206. Here, the UTRAN 202 may include any number of RNCs 206 and RNSs 207 in addition to the illustrated RNCs 206 and RNSs 207. The RNC 206 is an apparatus responsible for, among other things, assigning, reconfiguring and releasing radio resources within the RNS 207. The RNC 206 may be interconnected to other RNCs (not shown) in the UTRAN 202 through various types of interfaces such as a direct physical connection, a virtual network, or the like, using any suitable transport network.

The geographic region covered by the RNS 207 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 208 are shown in each RNS 207; however, the RNSs 207 may include any number of wireless Node Bs. The Node Bs 208 provide wireless access points to a core network (CN) 204 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. In a UMTS system, the UE 210 may further include a universal subscriber identity module (USIM) 211, which contains a user's subscription information to a network. For illustrative purposes, one UE 210 is shown in communication with a number of the Node Bs 208. The downlink (DL), also called the forward link, refers to the communication link from a Node B 208 to a UE 210, and the uplink (UL), also called the reverse link, refers to the communication link from a UE 210 to a Node B 208.

The core network 204 interfaces with one or more access networks, such as the UTRAN 202. As shown, the core network 204 is a GSM core network. However, as those skilled in the art will recognize, the various concepts presented throughout this disclosure may be implemented in a RAN, or other suitable access network, to provide UEs with access to types of core networks other than GSM networks.

The core network 204 includes a circuit-switched (CS) domain and a packet-switched (PS) domain. Some of the circuit-switched elements are a mobile services switching center (MSC), a visitor location register (VLR), and a gateway MSC (GMSC). Packet-switched elements include a serving GPRS support node (SGSN) and a gateway GPRS support node (GGSN). Some network elements, like EIR, HLR, VLR and AuC may be shared by both of the circuit-switched and packet-switched domains.

In the illustrated example, the core network 204 supports circuit-switched services with a MSC 212 and a GMSC 214. In some applications, the GMSC 214 may be referred to as a media gateway (MGW). One or more RNCs, such as the RNC 206, may be connected to the MSC 212. The MSC 212 is an apparatus that controls call setup, call routing, and UE mobility functions. The MSC 212 also includes a visitor location register (VLR) that contains subscriber-related information for the duration that a UE is in the coverage area of the MSC 212. The GMSC 214 provides a gateway through the MSC 212 for the UE to access a circuit-switched network 216. The GMSC 214 includes a home location register (HLR) 215 containing subscriber data, such as the data reflecting the details of the services to which a particular user has subscribed. The HLR is also associated with an authentication center (AuC) that contains subscriber-specific authentication data. When a call is received for a particular UE, the GMSC 214 queries the HLR 215 to determine the UE's location and forwards the call to the particular MSC serving that location.

The illustrated core network 204 also supports packet-data services with a serving GPRS support node (SGSN) 218 and a gateway GPRS support node (GGSN) 220. GPRS, which stands for General Packet Radio Service, is designed to provide packet-data services at speeds higher than those available with standard circuit-switched data services. The GGSN 220 provides a connection for the UTRAN 202 to a packet-based network 222. The packet-based network 222 may be the Internet, a private data network, or some other suitable packet-based network. The primary function of the GGSN 220 is to provide the UEs 210 with packet-based network connectivity. Data packets may be transferred between the GGSN 220 and the UEs 210 through the SGSN 218, which performs primarily the same functions in the packet-based domain as the MSC 212 performs in the circuit-switched domain.

The UMTS air interface may be a spread spectrum direct-sequence code division multiple access (DS-CDMA) system. The spread spectrum DS-CDMA spreads user data through multiplication by a sequence of pseudorandom bits called chips. The W-CDMA air interface for UMTS is based on such DS-CDMA technology and additionally calls for a frequency division duplexing (FDD). FDD uses a different carrier frequency for the uplink (UL) and downlink (DL) between a Node B 208 and a UE 210. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles are equally applicable to a TD-SCDMA air interface.

Figure 3:
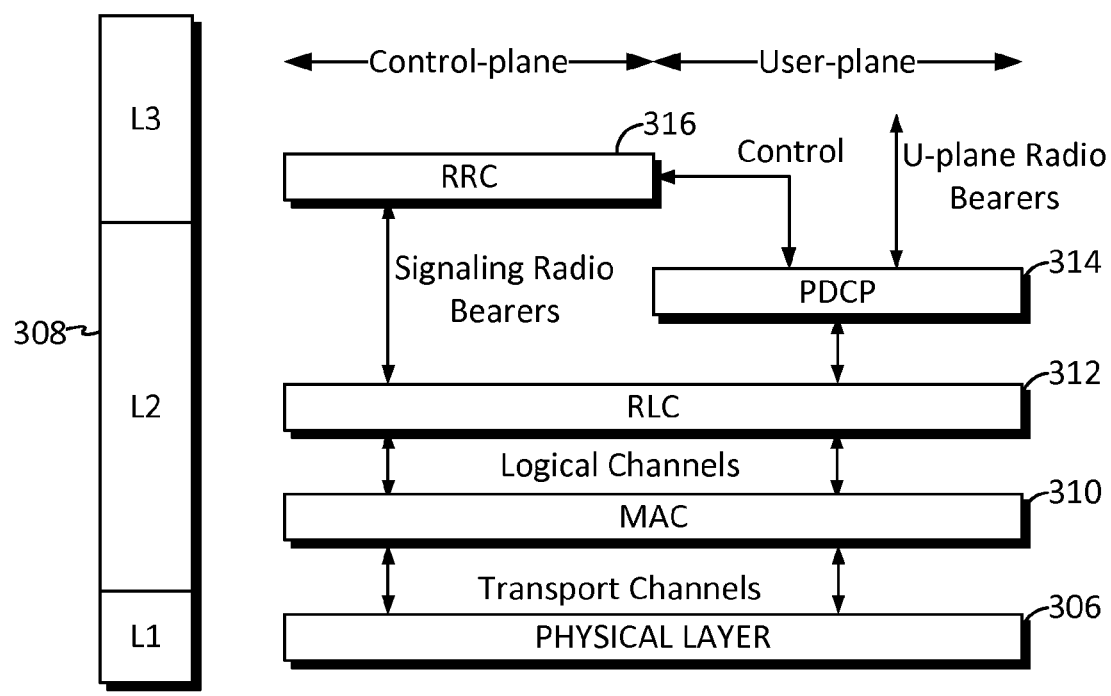
FIG. 3 is a conceptual diagram illustrating an example of a radio protocol architecture for the user and control plane.

The radio protocol architecture for the air interface between the UE 210 and the UTRAN 202 may take on various forms depending on the particular application. An example will now be presented with reference to FIG. 3, illustrating an example of the radio protocol architecture for the user and control planes between the UE 210 and the Node B 208. Here, the user plane or data plane carries user traffic, while the control plane carries control information, i.e., signaling.

Turning to FIG. 3, the radio protocol architecture for the UE 210 and Node B 208 is shown with three layers: layer 1, layer 2, and layer 3. Layer 1 is the lowest layer and implements various physical layer signal processing functions. Layer 1 will be referred to herein as the physical layer 306. The data link layer, called layer 2 (L2 layer) 308 is above the physical layer 306 and is responsible for the link between the UE and Node B over the physical layer 306.

At layer 3, the RRC layer 316 handles the control plane signaling between the UE 210 and the Node B 208. RRC layer 316 includes a number of functional entities for routing higher layer messages, handling broadcast and paging functions, establishing and configuring radio bearers, etc.

In the UTRA air interface, the L2 layer 308 is split into sublayers. In the control plane, the L2 layer 308 includes two sublayers: a medium access control (MAC) sublayer 310 and a radio link control (RLC) sublayer 312. In the user plane, the L2 layer 308 additionally includes a packet data convergence protocol (PDCP) sublayer 314. Although not shown, the UE 210 may have several upper layers above the L2 layer 308 including a network layer (e.g., IP layer) that is terminated at a PDN gateway on the network side, and an application layer that is terminated at the other end of the connection (e.g., far end UE, server, etc.).

The PDCP sublayer 314 exists in the user plane, and provides functions including header compression for upper layer data packets to reduce radio transmission overhead, user data transfer between the non-access stratum and the appropriate RLC entity, and handover support for UEs between Node Bs.

The RLC entity 312 generally supports acknowledged, unacknowledged, and transparent mode data transfers, and provides functions including segmentation and reassembly of upper layer data packets into or from RLC protocol data units (RLC PDUs), error correction by retransmission of lost data packets, flow control, ciphering, and reordering of data packets, e.g., to compensate for out-of-order reception due to a hybrid automatic repeat request (HARQ). The RLC entity 312 may communicate with one or more MAC entities 310 over logical channels.

The MAC sublayer 310 provides multiplexing between logical channels, from the RLC entity 312, and transport channels, from the physical layer 306. The MAC sublayer 310 is also responsible for allocating the various radio resources (e.g., resource blocks) in one cell among the UEs, as well as HARQ operations. The MAC sublayer 310 includes various MAC entities, including but not limited to a MAC-d entity and MAC-hs/ehs entity. In the present disclosure, a MAC entity may refer to any one or more of the various MAC entities included in the MAC sublayer 310. Upon completion of processing of downlink packets, the MAC sublayer 310 generally delivers the packets to the RLC entity 312.

Figure 4:
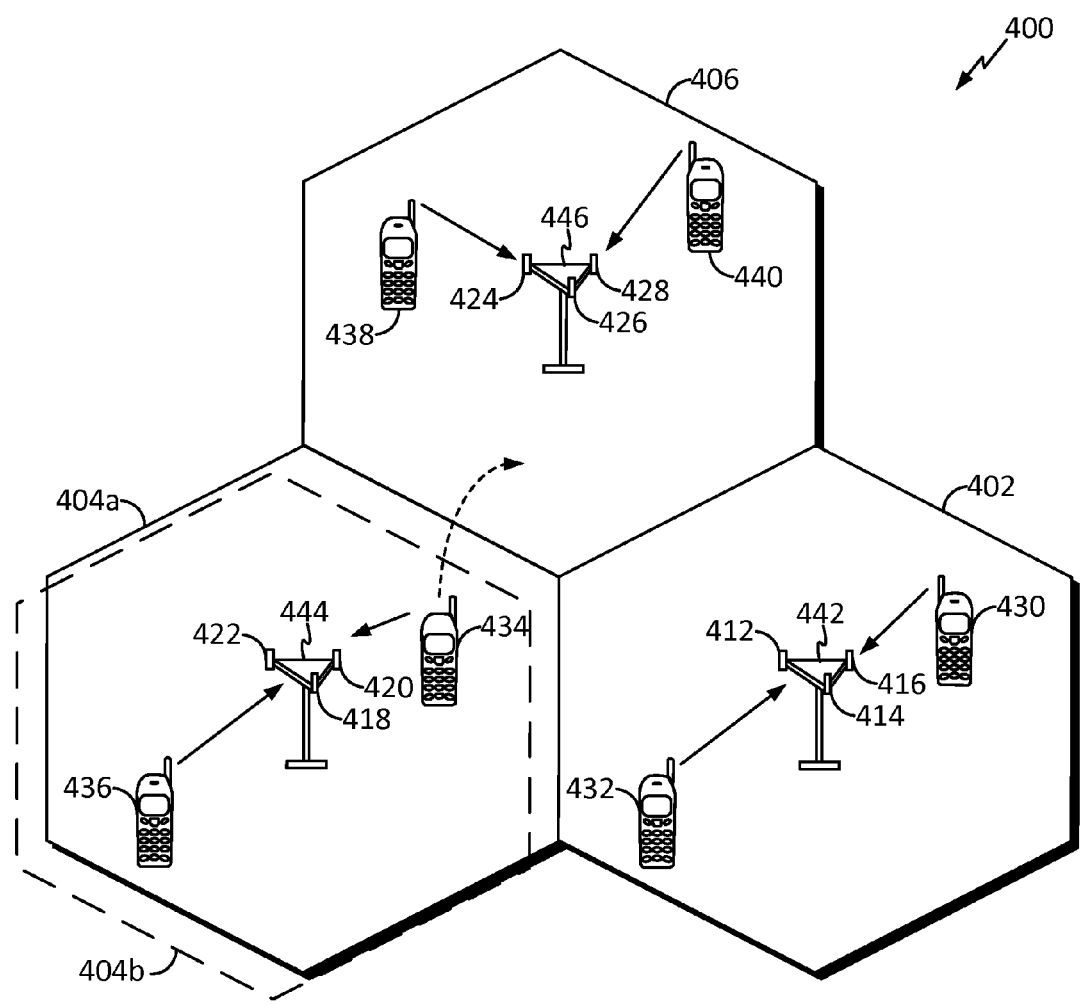
FIG. 4 is a conceptual diagram illustrating an example of an access network.

FIG. 4 illustrates by way of example and without limitation a simplified access network 400 in a UTRAN architecture, which may utilize a 3G/W-CDMA air interface between the UEs and the UTRAN. The system includes multiple cellular regions (cells), including cells 402, 404, and 406, each of which may include one or more sectors. Cells may be defined geographically, e.g., by coverage area, and/or may be defined in accordance with a carrier frequency, scrambling code, etc. That is, the illustrated geographically-defined cells 402, 404, and 406 may each be further divided into a plurality of cells, e.g., by utilizing different carrier frequencies or scrambling codes. For example, cell 404a may utilize a first carrier frequency or scrambling code, and cell 404b, while in the same geographic region and served by the same Node B 444, may be distinguished by utilizing a second carrier frequency or scrambling code.

In a cell that is divided into sectors, the multiple sectors within a cell can be formed by groups of antennas with each antenna responsible for communication with UEs in a portion of the cell. For example, in cell 402, antenna groups 412, 414, and 416 may each correspond to a different sector. In cell 404, antenna groups 418, 420, and 422 each correspond to a different sector. In cell 406, antenna groups 424, 426, and 428 each correspond to a different sector.

The cells 402, 404 and 406 may include several UEs that may be in communication with one or more sectors of each cell 402, 404 or 406. For example, UEs 430 and 432 may be in communication with Node B 442, UEs 434 and 436 may be in communication with Node B 444, and UEs 438 and 440 may be in communication with Node B 446. Here, each Node B 442, 444, 446 is configured to provide an access point to a core network 204 (see FIG. 2) for all the UEs 430, 432, 434, 436, 438, 440 in the respective cells 402, 404, and 406.

During a call with the source cell 404a, or at any other time, the UE 436 may monitor various parameters of the source cell 404a as well as various parameters of neighboring cells such as cells 404b, 406, and 402. Further, depending on the quality of these parameters, the UE 436 may maintain some level of communication with one or more of the neighboring cells. During this time, the UE 436 may maintain an active set, that is, a list of cells that the UE 436 is simultaneously connected to (i.e., the UTRA cells that are currently assigning a downlink dedicated physical channel DPCH or fractional downlink dedicated physical channel F-DPCH to the UE 436 may constitute the active set).

Management of the active set can be enabled through the use of certain layer 3 radio resource control (RRC) messages between the RNC and UE. For example, the selection of cells to include in the active set may depend on certain UE measurements, which may be configured by the network in a system information block (SIB).

For example, the UE may measure a ratio between the signal strength and the noise floor ($E_c/I_0$) of a pilot signal (e.g., a common pilot channel CPICH) transmitted by each cell in the UE's monitored set. That is, the UE may determine the $E_c/I_0$ for nearby cells, and may rank the cells based on these measurements.

When the ranking of a cell changes, or if any other reporting trigger or measurement event (discussed in further detail below) occurs, the UE may send certain RRC messages to the RNC to report this event. Thus, the RNC may make a decision to alter the active set for the UE, and send an RRC message (i.e., an active set update message) to the UE indicating a change in the active set. The RNC may then communicate with the respective Node B or Node Bs, e.g., over an Iub interface utilizing Node B application part (NBAP) signaling to configure the cells for communication with the UE. Finally, the RNC may communicate with the UE utilizing further RRC messages, such as a physical channel reconfiguration (PCR) message, with an RRC response from the UE of PCR complete, indicating success of the reconfiguration.

One reporting trigger may result when a primary CPICH enters the reporting range for the UE. That is, when the $E_c/I_0$ for a particular cell reaches a particular threshold (e.g., a certain number of dB below the $E_c/I_0$ of the primary serving cell) and maintains that level for a certain time such that it may be appropriate to add the cell to the active set a measurement event called Event 1A may occur.

Another reporting trigger may result when a primary CPICH leaves the reporting range. That is, when the $E_c/I_0$ for a particular cell falls below a particular threshold (e.g., a certain number of dB below the $E_c/I_0$ of the primary serving cell), and maintains that level for a certain time such that it may be appropriate to remove the cell from the active set a measurement event called Event 1B may occur.

Another reporting trigger may result when the active set is full, and a primary CPICH of a candidate cell outside the active set exceeds that of the weakest cell in the active set, such that it may be appropriate to replace the weakest cell in the active set with the candidate cell. Here, a measurement event called Event 1C may occur, causing a combined radio link addition and removal.

A high speed packet access (HSPA) air interface includes a series of enhancements to the 3G/W-CDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL).

In Release 5 of the 3GPP family of standards, high speed downlink packet access (HSDPA) was introduced. HSDPA utilizes as its transport channel the high-speed downlink shared channel (HS-DSCH), which may be shared by several UEs. The HS-DSCH is implemented by three physical channels: the high-speed physical downlink shared channel (HS-PDSCH), the high-speed shared control channel (HS-SCCH), and the high-speed dedicated physical control channel (HS-DPCCH).

The HS-DSCH may be associated with one or more HS-SCCH. The HS-SCCH is a physical channel that may be utilized to carry downlink control information related to the transmission of HS-DSCH. The UE may continuously monitor the HS-SCCH to determine when to read its data from the HS-DSCH, and the modulation scheme used on the assigned physical channel.

The HS-PDSCH is a physical channel that may be shared by several UEs. The HS-PDSCH may support quadrature phase shift keying (QPSK) and 16-quadrature amplitude modulation (16-QAM) and multi-code transmission.

The HS-DPCCH is an uplink physical channel that may carry feedback from the UE to assist the Node B in its scheduling algorithm. The feedback may include a channel quality indicator (CQI) and a positive or negative acknowledgement (ACK/NAK) of a previous HS-DSCH transmission.

One difference on the downlink between HSDPA and the previously standardized circuit-switched air-interface is the absence of soft handover in HSDPA. This means that HSDPA channels are transmitted to the UE from a single cell called the HSDPA serving cell. As the user moves, or as one cell becomes preferable to another, the HSDPA serving cell may change. Still, the UE may be in soft handover on the associated DPCH, receiving the same information from plural cells.

In Rel. 5 HSDPA, at any instance a UE has one serving cell, being the strongest cell in the active set as according to the UE measurements of $E_c/I_0$. According to mobility procedures defined in Rel. 5 of 3GPP TS 25.331, the radio resource control (RRC) signaling messages for changing the HSPDA serving cell are transmitted from the current HSDPA serving cell (i.e., the source cell), and not the cell that the UE reports as being the stronger cell (i.e., the target cell).

That is, in addition to the reporting triggers dealing with Event 1A and Event 1B, described above, for HSDPA, another reporting trigger may result when a neighbor cell (which may or may not be within the active set) exceeds the quality of the serving HS-DSCH cell according to the UE measurements of $E_c/I_0$. In this case it may be appropriate to re-select the serving HS-DSCH cell. Thus, a measurement event called Event 1D may be utilized to change the best serving HS-DSCH cell.

Release 8 of the 3GPP standards brought dual cell HSDPA (DC-HSDPA), which enables a UE to aggregate dual adjacent 5-MHz downlink carriers transmitted by a Node B. The dual carrier approach provides higher downlink data rates and better efficiency at multicarrier sites. Generally, DC-HSDPA utilizes a primary carrier and a secondary carrier, where the primary carrier provides the channels for downlink data transmission and the channels for uplink data transmission, and the secondary carrier provides a second set of HS-PDSCHs and HS-SCCHs for downlink communication. Here, the primary carrier is generally the best serving HS-DSCH cell according to the UE measurements of $E_c/I_0$, and can be swapped with the secondary serving cell by utilizing the Event 1D measurement event. Further, Event 1A can be utilized in a multi-cell network to add a secondary serving cell without changing the primary serving cell; and Event 1B can be utilized to eliminate the secondary serving cell.

As discussed above, DC-HSDPA provides for downlink carrier aggregation. The carrier aggregation achieved in 3GPP Release 8 DC-HSDPA and its subsequent enhancements provides benefits in terms of user experience, including latency reduction for bursty traffic.

According to aspects of the present disclosure, another form of aggregation, which may be referred to as soft aggregation, can provide for downlink aggregation wherein the respective downlink cells utilize the same carrier frequency. Soft aggregation strives to realize similar gains to DC-HSDPA in a single-carrier network.

Figure 5:
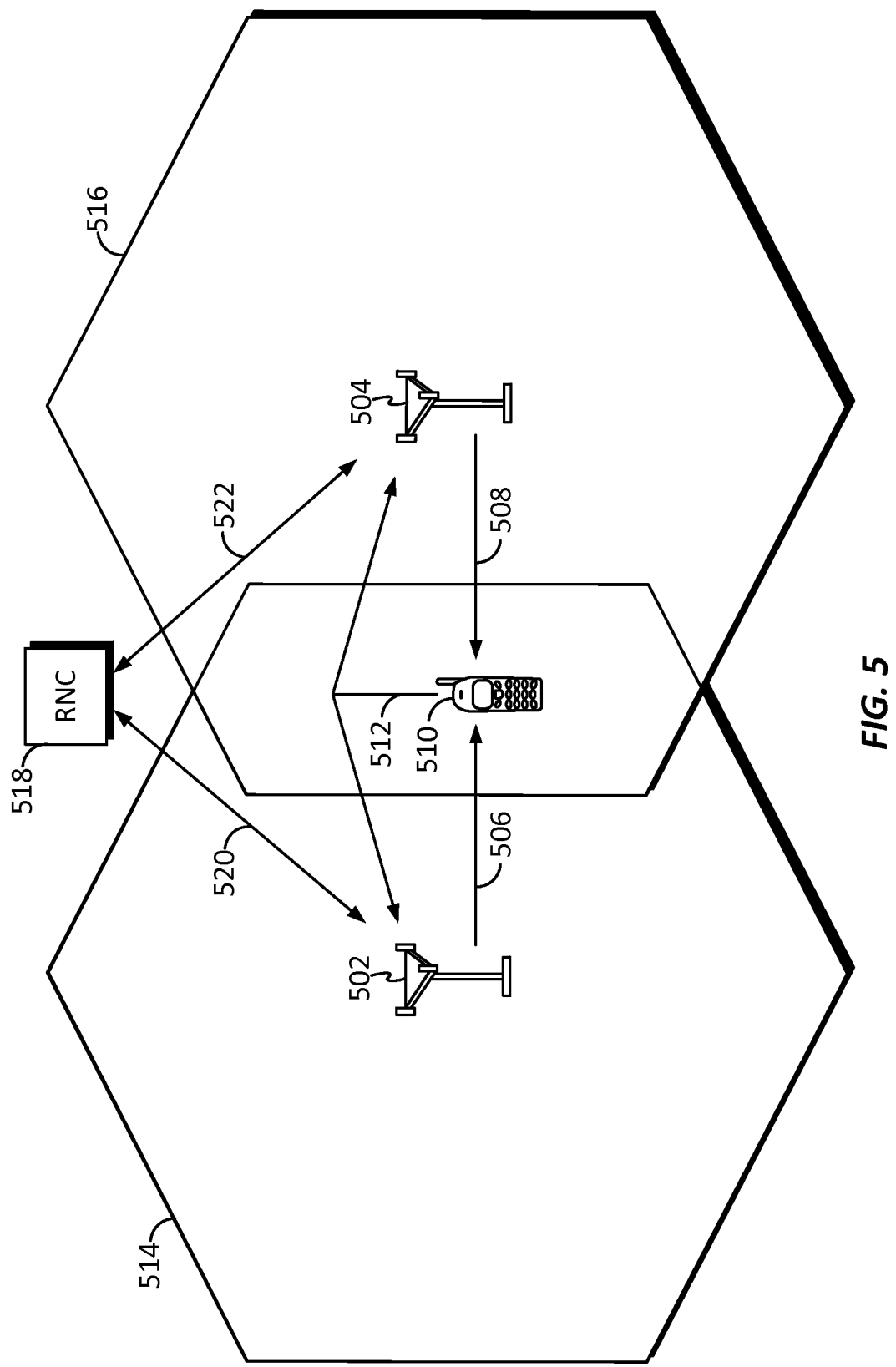
FIG. 5 is a schematic diagram representing a soft handover between non-co-located sectors in a SFDC-HSDPA system.

FIG. 5 illustrates an exemplary system for soft aggregation in accordance with some aspects of the present disclosure. In FIG. 5, there may be a geographic overlap between two or more cells 514 and 516, such that a UE 510 may be served, at least for a certain period of time, by the multiple cells. Thus, a wireless telecommunication system in accordance with the present disclosure may provide HSDPA service from a plurality of cells on a single frequency channel, such that a UE 510 may perform downlink carrier aggregation in a single-frequency network. For example, a setup utilizing two or more cells may be referred to as multi-flow HSDPA, coordinated multi-point HSDPA (CoMP HSDPA), or simply multi-point HSDPA. One example of a multi-point HSDPA network that enables aggregation of two downlink channels may be referred to as single frequency dual cell HSDPA (SFDC-HSDPA). However, other terminology may freely be utilized. In this way, users at cell boundaries, as well as the overall system, may benefit from a high throughput. In various examples, the different cells may be provided by the same Node B (frequently called softer aggregation), or the different cells may be provided by disparate Node Bs (frequently called soft aggregation).

In the scheme illustrated in FIG. 5, two Node Bs 502 and 504, coupled to an RNC 518, each provide a downlink cell 506 and 508, respectively, wherein the downlink cells are in substantially the same carrier frequency. Of course, as already described, in another example for softer aggregation, both downlink cells 506 and 508 may be provided from different sectors of the same Node B. The UE 510 receives and aggregates the downlink cells and provides an uplink channel 512, which may be received by one or both Node Bs 502 and 504. The uplink channel 512 from the UE 510 may provide feedback information, e.g., corresponding to the downlink channel state for the corresponding downlink cells 506 and 508.

In some aspects of the present disclosure, the cells being aggregated may be restricted to cells in the UE's active set. These cells may be the strongest cells in the active set, determined in accordance with the downlink channel quality. If the strongest cells reside in different Node B sites, this scheme may be called 'soft aggregation'. If the strongest cells to be aggregated are different sectors residing in the same Node B site, this scheme may be called 'softer aggregation.'

A DC-HSDPA-capable UE has two receive chains, each of which may be used to receive HS data from a different carrier. In a multi-point HSDPA-capable UE 510 according to an aspect of the present disclosure, if the plural receive chains are made to receive HS data from different cells, at least some the benefits from aggregation can be realized in a single-carrier network.

Figure 6:
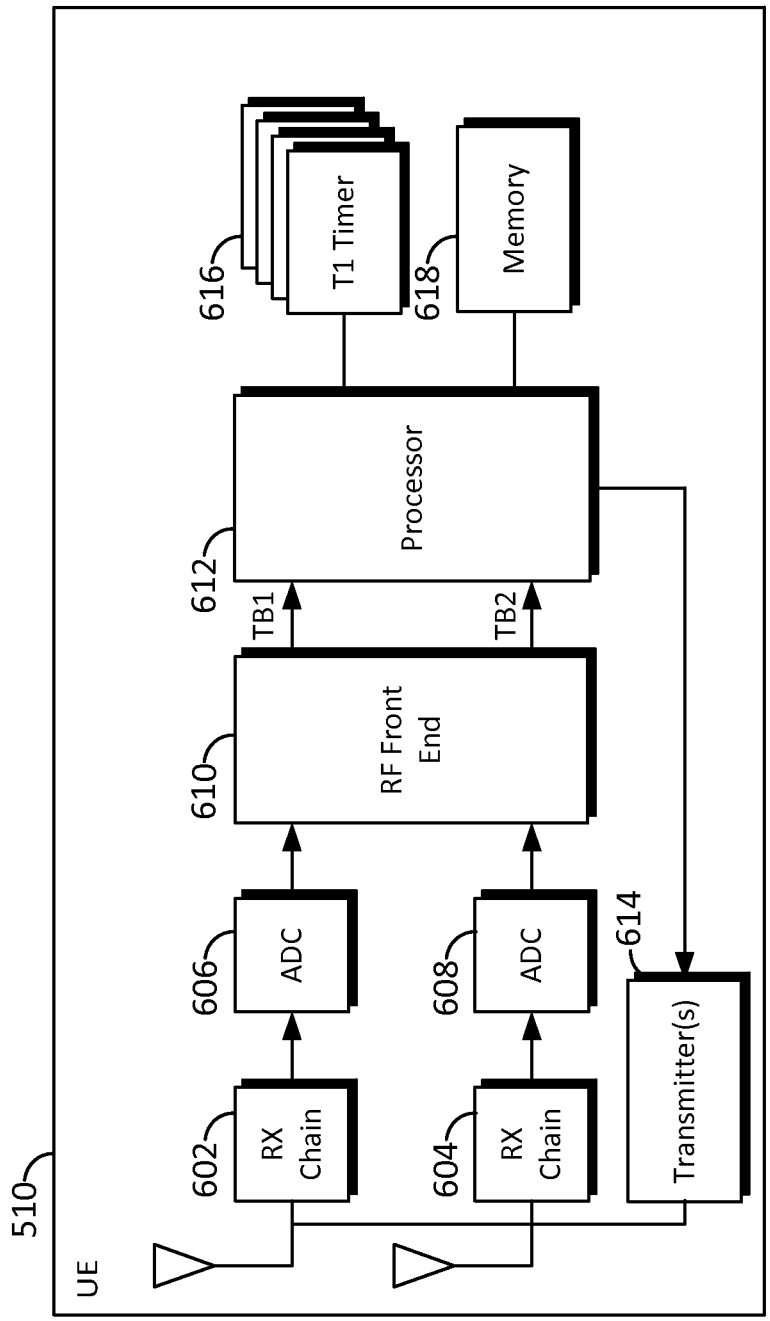
FIG. 6 is a simplified block diagram illustrating some of the components of an exemplary UE configured for SFDC-HSDPA communication.

FIG. 6 is a simplified block diagram illustrating some of the components of an exemplary UE 510 for use in a SFDC-HSDPA network in accordance with some aspects of the present disclosure. In the illustration, the UE 510 includes two receive chains 602 and 604 for receiving respective downlink signals in the same carrier frequency, as in a SFDC-HSDPA network. However, within the scope of the present disclosure a UE may include any number of receive chains, for receiving downlink signals in the same carrier frequency or in any suitable number of different carrier frequencies.

Coupled to the receive chains 602 and 604 may be respective analog to digital converters 606 and 608, which transform the received downlink signals to the digital domain to be further processed by an RF front end 610. The RF front end 610 may then provide the received transport blocks to a processor 612 to be further processed in accordance with the received information. In some examples, the processor 612 may be the same as the processing system 114 illustrated in FIG. 1. The processor 612 may additionally be coupled to one or more transmitters 614, which may utilize one or more of the antennas as managed by a suitable duplexer.

The processor 612 may additionally utilize one or more reordering release timers (T1 timers) 616 for measuring a time to wait for a packet at the MAC layer as described in further detail below, and a memory 618 for storing information useful for the processing of the information.

Figure 7:
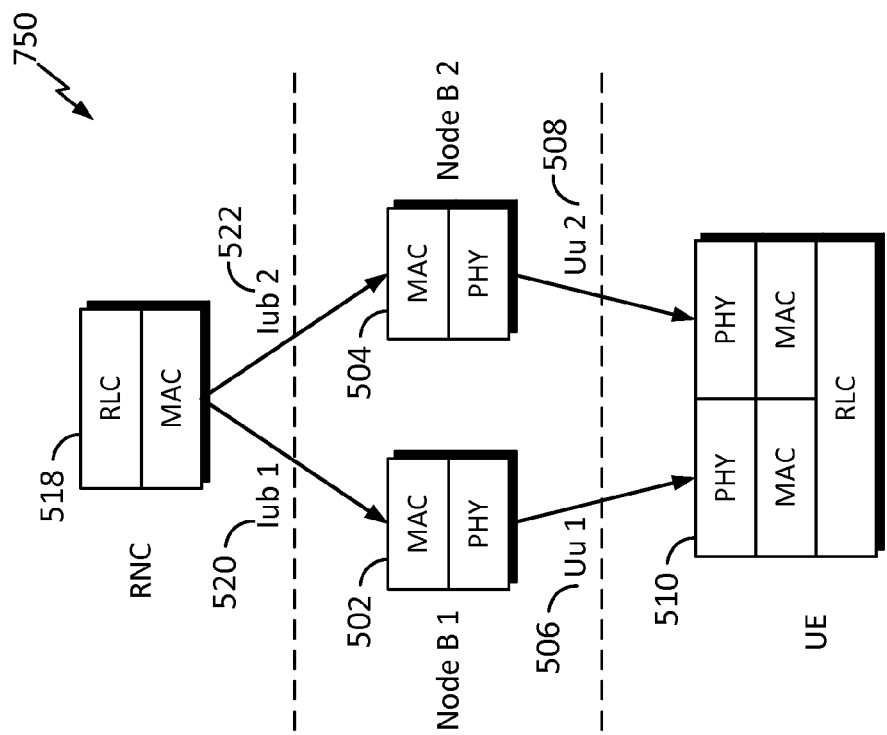
FIG. 7 is a schematic diagram comparing downlink paths in an HSDPA network and an SFDC-HSDPA network.
Figure 7:
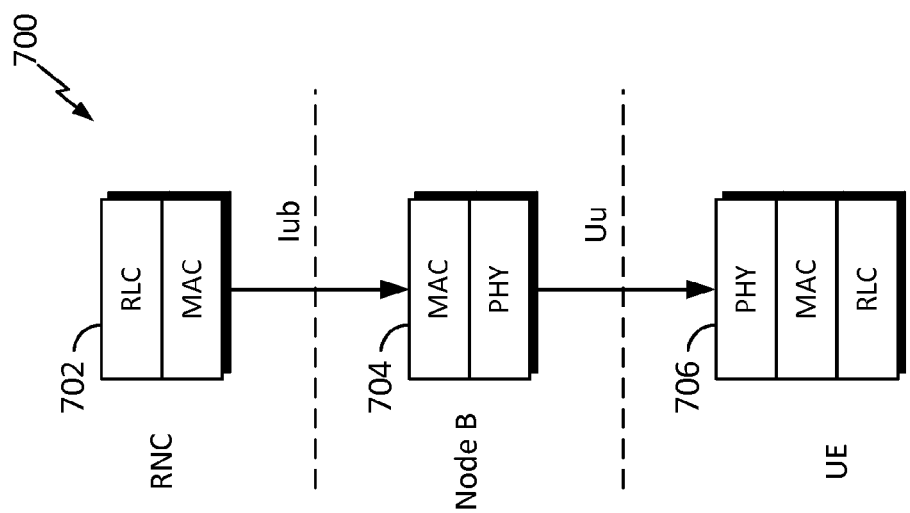

FIG. 7 is a schematic illustration comparing downlink paths in an HSDPA network 700 and an SFDC-HSDPA network 750. The SFDC-HSDPA network 750 may be the same as the system configured for soft aggregation and illustrated in FIG. 5.

In the HSDPA example 700 (the same or similar illustration may also apply to a DC-HSDPA network), a downlink path between an RNC 702 and a UE 706 passes through a Node B 704. Here, the RNC 702 houses protocol layers from the MAC layer and above, including, for example, the RLC sublayer. For the high-speed downlink channels, a MAC layer also resides at the Node B 704. Further, a PHY layer at the Node B 704 provides an air interface for communicating with a corresponding PHY layer at the UE 706, e.g., over an HS-DSCH.

From the UE 706 side, a MAC entity is configured to control access to the dedicated transport channels and to handle the HSDPA-specific functions, and to control access to the HS-DSCH transport channel. Upper layers within the UE 706 may configure which of two different MAC entities, a MAC-hs or a MAC-ehs, is to be applied to handle HS-DSCH functionality. In the present disclosure, the MAC-ehs entity will be described as an illustrative example. However, those skilled in the art will recognize that the MAC-hs entity or any suitable MAC entity may be utilized in accordance with various aspects described herein.

The MAC-ehs entity was standardized with Release 7 of the 3GPP family of standards. The MAC-ehs provides support for flexible RLC PDU sizes, and MAC segmentation and reassembly. The MAC-ehs also provides for the multiplexing of data from several priority queues within one TTI.

Figure 8:
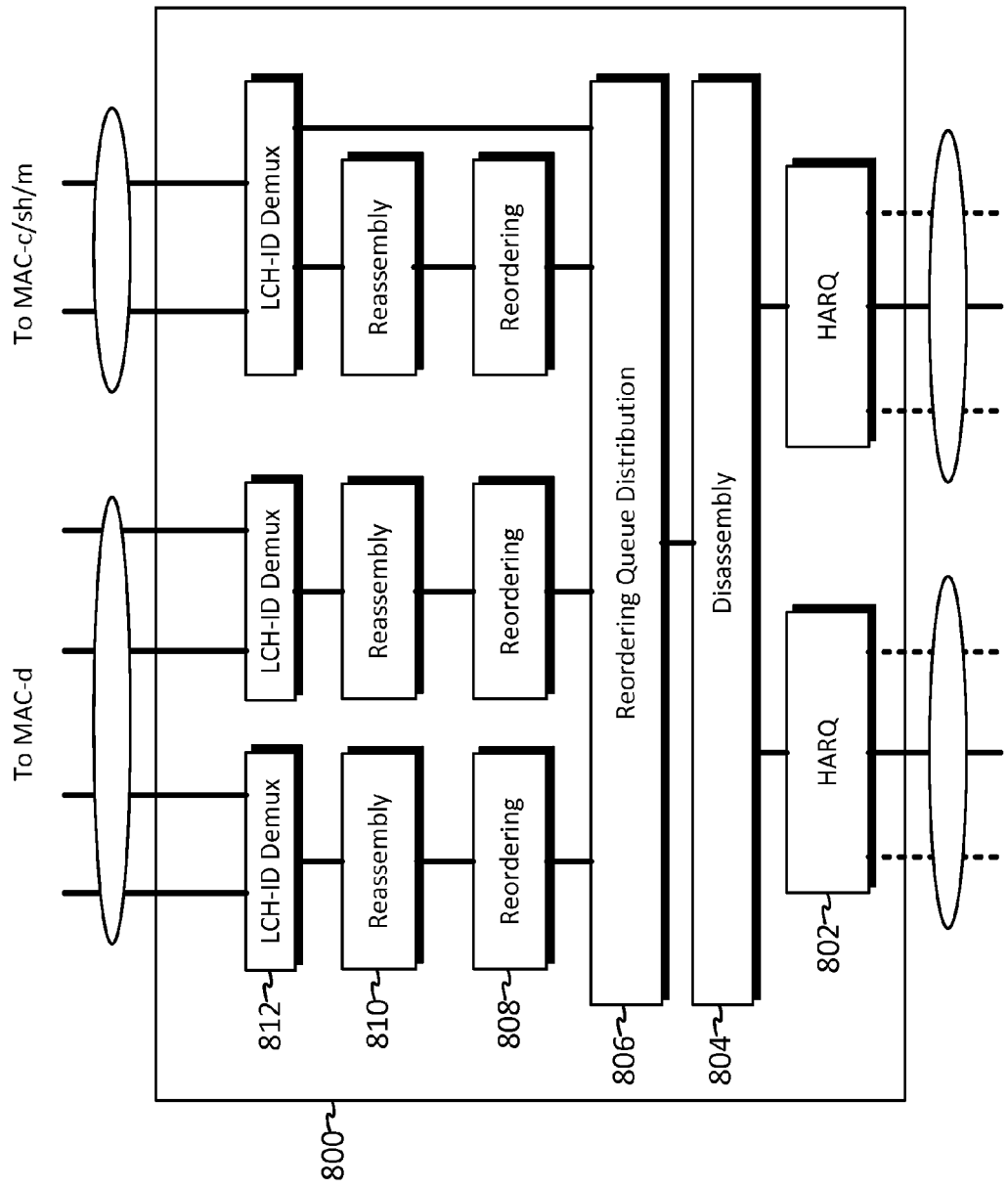
FIG. 8 is a schematic diagram illustrating a MAC-ehs layer.

The UE side MAC-ehs entity 800 is illustrated in FIG. 8. The MAC-ehs entity 800 may include a plurality HARQ entities 802, a disassembly entity 804, a re-ordering queue distribution entity 806, and a plurality of re-ordering queues each including a reordering entity 808, a reassembly entity 810, and a LCH-ID demultiplexing entity 812.

There is generally one HARQ entity 802 per HS-DSCH transport channel. The HARQ entity 802 is configured to handle MAC functions and tasks related to the HARQ protocol, such as generating ACKs or NACKs. That is, when the Node B transmits a MAC-ehs protocol data unit (PDU) having a particular queue identifier (QID) to the UE, the UE may respond as to whether it successfully received the PDU by sending an acknowledgment signal, i.e., a HARQ ACK or NACK. If the PDU was not successfully received, i.e., the Node B received a NACK, the Node B may retransmit all or a part of the symbols that make up the original PDU to the UE 510 in an attempt to allow recovery of the PDU. The Node B generally keeps retransmitting these further packets until it receives an ACK or reaches a maximum number of allowed retransmissions. After the maximum number is reached, the Node B generally ceases the retransmissions, discards the PDU, and transmits the next PDU with the next sequential transmission sequence number (TSN) to the UE.

Although the UE unsuccessfully decoded a PDU and sent a NACK, the received but unsuccessfully decoded PDU is generally not discarded by the UE. Rather, when retransmissions are received, the UE combines the first unsuccessfully recovered PDU with the retransmissions and performs error correction to recover the contents of the PDU. With each additional retransmission, the probability of recovering the original PDU may increase.

Further, as shown in FIG. 8, the UE side MAC-ehs entity 800 has a reordering queue distribution entity 806 configured to route MAC-ehs PDUs to the correct reordering queues based on the received LCH-ID. The reordering entity 808 organizes received reordering PDUs according to the received TSN. Data blocks with consecutive TSNs are then delivered to a reassembly entity 810.

A timer mechanism, e.g., utilizing a re-ordering release timer (i.e., a T1 timer) at the reordering entity 808 determines delivery of non-consecutive data blocks to higher layers. There is generally one reordering entity 808 for each priority class.

At the MAC layer, MAC PDUs include a header that generally includes a TSN. Here, the TSN may provide an identifier, indicating the transmission sequence of the respective MAC PDUs. The TSN is generally utilized for reordering purposes, e.g., to support in-sequence delivery of the MAC PDUs to higher layers.

Returning once again to FIG. 7, in a conventional DC-HSDPA network as illustrated in system 700, or in a multipoint HSDPA system configured for softer aggregation, both downlink carriers are provided by a single Node B site 704. Thus, both cells share the same MAC entity. Because the downlink data comes to the UE 706 from a single Node B site 704, the RLC entity at the UE 706 may generally assume that any control packets are received in order, and that the control packets arrive from the current primary serving cell. That is, although acknowledged mode data packets (AMD RLC PDUs) generally include an RLC sequence number and can be accordingly re-ordered as needed at the RLC entity, control packets at the RLC layer, also called RLC status PDUs, generally do not include sequence numbers. Rather, there are various timers that determine how often the control packets are sent, and generally enable in-order delivery of the control packets when there is only one Node B site 704 providing the downlink data. Accordingly, in a conventional single-cell HSDPA system there is generally no method for the RLC entity at the receiver to determine whether two of the control packets are delivered out of order.

On the other hand, in the SFDC-HSDPA network 750, the RNC 518 may provide packets to a plurality of Node Bs 502 and 504, each providing respective downlink HS-transmissions to the UE 510. Thus, the RNC 518 may include a multi-link RLC sublayer, wherein a flow control algorithm may allocate packets for the UE 510 among the plurality of cells (e.g., at Node Bs 502 and 504) utilizing a plurality of RLC links, e.g., over respective Iub interfaces 520 and 522. Of course, the multi-link RLC implementation is only one example provided herein for clarity of explanation, and other implementations of downlink carrier aggregation may be utilized within the scope of the present disclosure.

Here, the UE 510 may include a plurality of MAC entities, each of the plurality of MAC entities corresponding to a different serving cell (e.g., a primary serving cell and a secondary serving cell) from corresponding Node B sites. For example, a first MAC entity in the UE 510 may correspond to the first Node B 502 providing a primary serving cell, and a second MAC entity in the UE 510 may correspond to the second Node B 504 providing a secondary serving cell. Of course, for various reasons, the pairing of a particular MAC entity with a particular Node B may change over time, and the illustration is only one possible example. In some examples, the UE 510 may include a plurality of MAC-ehs entities such as the MAC-ehs entity 800 illustrated in FIG. 8.

During the soft aggregation such as in the SFDC-HSDPA example, the MAC layer TSN space is generally different for each of the respective links. That is, each of the links has its own MAC TSN space. Therefore, when the UE 510 delivers MAC PDUs having TSNs in the respective sequence they were received from each link to the RLC layer, the RLC PDUs may be out of sequence. When the out of sequence RLC PDUs are control packets such as the RLC status PDUs, this can result in various issues to be handled by the RLC layer, some of which may cause undesired problems such as an RLC reset.

One rather straightforward approach may be to modify the RLC PDU format such that RLC status PDUs include sequence numbers. In this way, the RLC entity may suitably re-order out-of-order control packets, or reject the control packets when they are received out of order. However, modification of the PDU format can cause other implications to the system and such changes to the standard definition of the control packets may not be desired.

The out-of-order control packet issue may be somewhat alleviated by constraining a system only to send the RLC status PDUs on the primary link. In this way, since the control packets are not sent over any link but the primary link, timing may be better controlled, and the probability that a control PDU is processed at the RLC layer out of order may be reduced. However, as described below, although this constraint may reduce the issue, it is still possible for control packets to arrive at the RLC layer out of order, particularly in the case of a serving cell change.

Figure 9:
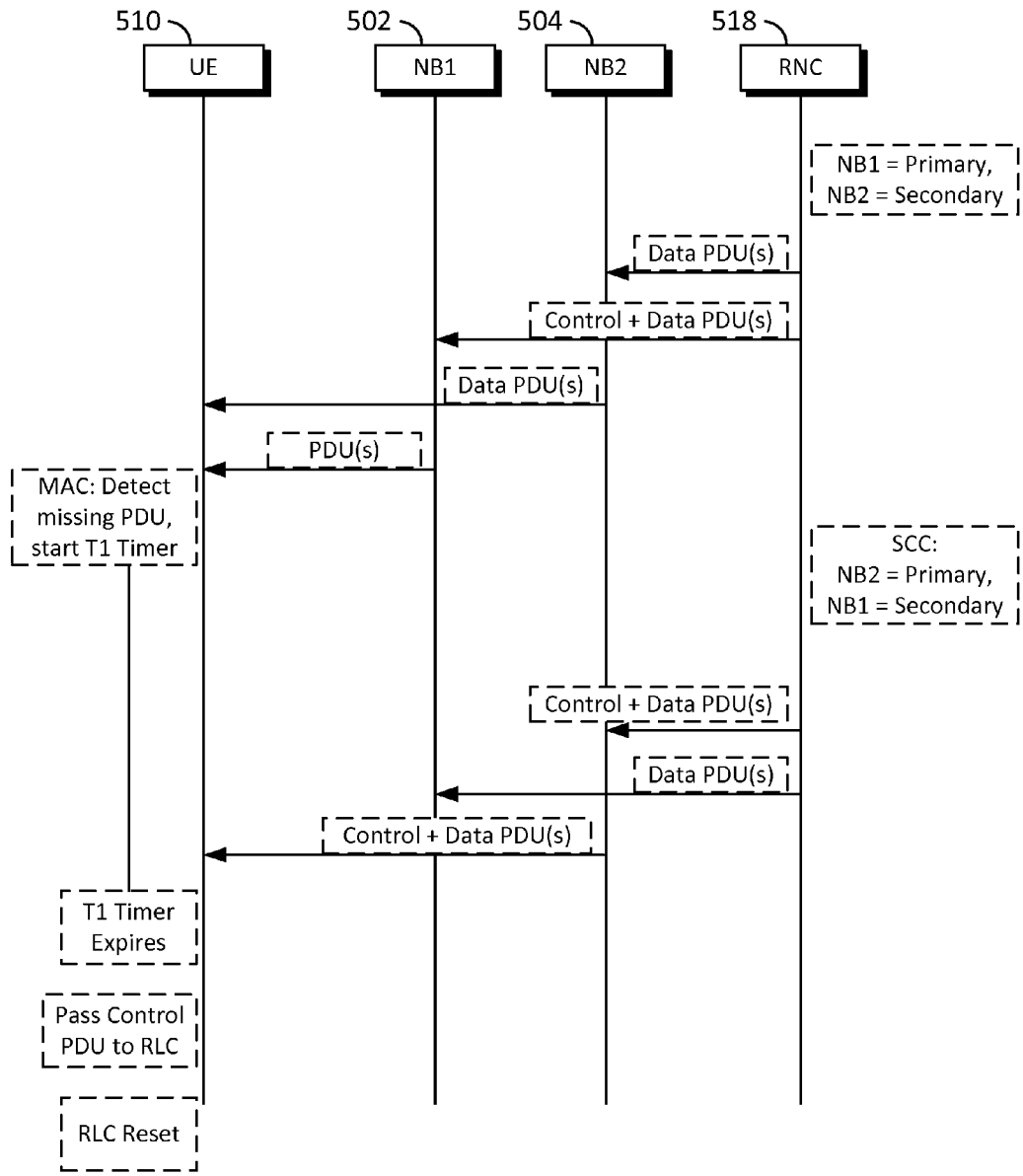
FIG. 9 is a call flow diagram illustrating a certain sequence of events that may lead to an RLC reset after a serving cell change.

FIG. 9 is a call flow diagram illustrating a certain problematic sequence of events that may lead to an RLC reset after a serving cell change. In the illustration, the UE 510 is enabled to receive dual HSDPA downlinks, such as the UE 510 illustrated in FIG. 6.

In the illustrated scenario, a SFDC-HSDPA call is assumed to have been established, with the first Node B 502 acting as the primary serving cell, and the second Node B 504 acting as the secondary serving cell.

The RNC 518 may receive a stream of packets from the core network 204 for the UE 510. Here, the RNC 518 may allocate a portion of the stream to the Node Bs 502 and 504 according to any suitable flow control algorithm. For example, in an implementation 750 as shown in FIG. 7, a multi-link RLC sublayer at the RNC 518 may allocate a first portion of the stream to the first Node B 502, and a second portion of the stream to the second Node B 504.

Here, the portion of the stream allocated to the first Node B 502, which acts as the primary serving cell, may include at least one control packet and at least one data packet. However, the portion of the stream allocated to the second Node B 504 may only include at least one data packet. That is, in accordance with an aspect of the present disclosure, an SFDC-HSDPA network may be constrained such that only the primary serving cell may send control packets to the UE 510.

As the received packets are queued at the first and second Node Bs 502 and 504, the packets may be transmitted over the respective downlink air interfaces 506 and 508 to the UE 510. Thus, the first Node B 502 may attempt to transmit its queued control packets and data packets, and the second Node B 504 may attempt to transmit its queued data packets. In the illustrated example, at least one data packet transmitted by the first Node B 502 may not arrive at the UE 510. That is, due to a transmission failure, a decoding failure, or any other reason, the system may attempt HARQ retransmissions to recover the data packet, but at least one data packet may be lost. Further, in the illustrated example, after the loss of the data packet, at least one control packet, such as an RLC status PDU containing an acknowledgment of a packet "X," may be successfully received at the UE 510. In this example, the lost data packet and the received control packet may have successive TSN numbers at the MAC layer. Here, because a lower numbered MAC packet is missing, the MAC layer of the UE 510 corresponding to the first Node B 502 may detect the missing data packet, for example by detecting a gap in the transmission sequence numbers (TSNs) of the received packets. That is, the TSN corresponding to the missing packet may be detected to be missing among the TSNs corresponding to packets that were received at the UE 510 from the first Node B 502.

Here, the MAC entity at the UE 510 corresponding to the first Node B 502 may start a timer, referred to as a re-ordering release timer (i.e., a T1 timer), corresponding to the missing packet. The T1 timer is a timer that the MAC entity at the UE 510 may utilize to wait for the missing packet to be delivered. That is, the T1 timer is utilized to determine when packets are released to the upper layers (e.g., the RLC layer) even though there remain outstanding packets with lower TSN values. The value of the T1 timer, i.e., the length of time that it measures, may be configured by upper layers. That is, at the RNC 518, RLC-layer packets may be segmented into MAC packets before they are transmitted to the UE 510, and the segmented packets may be labeled according to which segment of a larger RLC packet is contained in the MAC packet. With this label, the MAC layer at the UE 510 can determine which of the received, queued MAC packets represent partial RLC packets, and which MAC packets either individually represent whole RLC packets or when combined together form whole RLC packets. Thus, when the T1 timer expires, partial packets that are missing one or more segments may be discarded, while any complete packets may be delivered to the RLC layer.

As the T1 timer runs, some of the received packets may remain in a queue at the MAC entity corresponding to the first Node B 502, while the MAC entity awaits the missing packet. For example, in the scenario described above, the control packet successfully received at the UE 510 may remain queued at the MAC layer while awaiting the failed data packet. If the T1 timer were to expire without receiving the corresponding packet, the MAC entity corresponding to the first Node B 502 may discard any partial packets it has received, and deliver any completed packets.

Prior to the expiration of the T1 timer, i.e., while the T1 timer is running and the MAC entity corresponding to the first Node B 502 continues to await the missing packet, a serving cell change (SCC) may take place. For example, in response to any of a number of different measurement events, the Node B designated as the primary serving cell may change. In the illustrated example of FIG. 9, an Event 1D is shown, wherein the first Node B 502 and the second Node B 504 may swap places as the primary and secondary serving cells, respectively. That is, in this example, prior to the SCC the first Node B 502 was the primary serving cell and the second Node B 504 was the secondary serving cell; and after the SCC the first Node B 502 is the secondary serving cell and the second Node B 504 is the primary serving cell. Despite the serving cell change, the packets that have not yet been acknowledged by the UE 510 may remain queued at the first Node B 502, and the T1 timer may continue to run, as the MAC entity corresponding to the first Node B 502 may expect that the missing packet may still be successfully received from the first Node B 502 after the serving cell change.

After the serving cell change, the RNC 518 may continue to allocate packets to the Node Bs. However, here, while the data packets may continue to be split between both Node Bs, due to the constraint that the control packets may only be transmitted from the primary serving cell, control packets are only provided to the second Node B 504, which is the new primary serving cell.

Here, as above, as the received packets are queued for transmission at the first and second Node Bs 502 and 504, the packets may be transmitted over the respective downlink air interfaces 506 and 508 to the UE 510. In the illustrated example, at least one control packet, such as an RLC status PDU containing an acknowledgment of packets "X" and "Y," may be transmitted from the second Node B 504, and may be properly decoded at the UE 510.

At this time, the MAC layer at the UE 510 corresponding to the second Node B 504 may deliver the received control packet to the RLC layer. That is, in an aspect of the present disclosure, when a received control packet is received at the RLC layer at the UE 510, that control packet may immediately be processed the RLC layer. Here, when the RLC layer at the UE 510 receives the acknowledgment for packets "X" and "Y," it may correspondingly advance its transmit window.

At some time later, the T1 timer corresponding to the missing packet, which is running in the MAC entity corresponding to the first Node B 502, may expire. That is, because a certain amount of time has passed, the UE 510 may consider the missing packet corresponding to the T1 timer to be lost, and may give up on waiting for a successful reception of that packet. Thus, as described above, the MAC entity at the UE 510 corresponding to the first Node B 502 may discard any partial packets in its queue and may deliver any completed packets in the queue to the RLC layer. As in the above-described scenario, this includes the previously received RLC status PDU including the acknowledgment for packet "X." However, as previously described, when the RLC layer at the UE already advanced its transmit window when it received the acknowledgment for packets "X" and "Y." Thus, when the acknowledgment for packet "X" is later received, since this is outside the transmit window, the UE 510 may initiate an RLC reset.

In one aspect of the present disclosure, a simple way to avoid such an RLC reset may be to alter the protocol such that an RLC reset is not performed when packets are acknowledged outside their transmit window. Here, the RLC entity may be configured to otherwise handle the out-of-order RLC control PDU in any suitable fashion to avoid the RLC reset. While such a change to the RLC layer protocol may cause certain complications relating to a case wherein a single serving cell is utilized, it can nevertheless reduce RLC resets in the multipoint case.

The RLC reset may results in a flushing of all the data in all the queues at the RLC entity, and thereby a loss of what very well may have been valid data at the UE. Further, the RLC reset may result in TCP timeouts, retransmissions, and potentially a call drop if there are undelivered signaling PDUs. Therefore, aspects of the present disclosure attempt to remediate this issue by reducing or eliminating such an RLC reset caused by out-of-order control packets resulting from this or a similar scenario.

In addition to the SFDC-HSDPA configuration described in detail herein, similar issues can arise in various system configurations. For example, the RLC reset issue described above can arise in a dual-frequency, dual-carrier DFDC-HSDPA configuration, or essentially any configuration wherein a UE includes more than one MAC entity delivering packets to a common upper layer. That is, because the plural MAC entities, each having their own TSN space, are aware of the MAC TSN but are generally not aware of the contents of the RLC packets, including whether the packet is a control packet or not, the respective MAC entities may pass out-of-order RLC control packets to the RLC layer, potentially resulting in the RLC reset as described above.

Thus, various aspects of the present disclosure provide mechanisms to reduce RLC resets caused by the above scenario. For example, one aspect of the disclosure may simply add sequence numbers to the RLC control PDUs. In another aspect of the disclosure, the handling of the packets at the MAC entity of the UE 510 may be modified, such that when the packet is delivered to the RLC entity, the RLC entity can determine whether the packet was transmitted by the current primary serving cell. In another aspect of the disclosure, the serving cell change procedure at the UE 510 may be modified to flush the MAC queue by delivering any completed packets to the RLC entity, discarding any partial packets queued at the MAC entity, and killing any running T1 timer at the MAC entity. In yet another aspect of the disclosure, the delivery of packets from the new primary serving cell following the serving cell change may be delayed at the MAC layer or at the RLC layer. In still another aspect of the disclosure, the RLC entity may be modified not to perform the reset procedure when out of order control packets are received at the RLC entity. Here, for example, the out-of-order control packets may simply be discarded.

Figure 10:
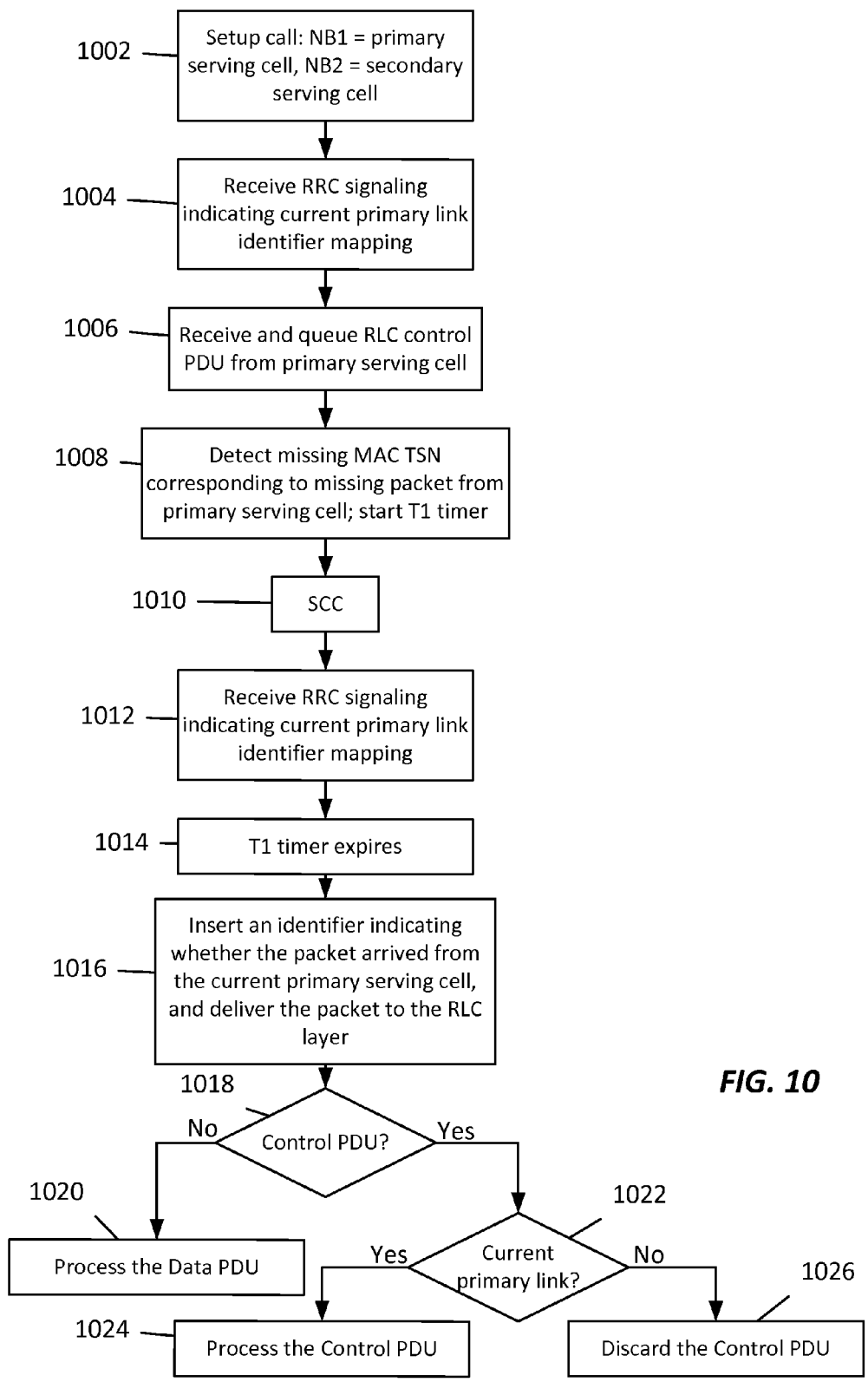
FIG. 10 is a flow chart illustrating an exemplary process for including a current primary link identifier when passing a packet from a MAC layer to an RLC layer.

FIG. 10 is a flow chart illustrating an exemplary process operable at a UE, such as the UE 510, for reducing RLC resets by utilizing an identifier for indicating the current primary link, in accordance with an aspect of the present disclosure. Here, the UE 510 may include a plurality of MAC entities corresponding to the reception of a plurality of downlink channels from respective cells. In some examples, the actions described herein may be performed by any one or more of the MAC entities at the UE 510, and in some examples the actions described herein may be performed by all MAC entities at the UE 510.

In block 1002, the UE 510 may setup a multi-point HSDPA call with the network utilizing the first Node B 502 as a primary serving cell, and the second Node B 504 as a secondary serving cell. Here, a first MAC entity at the UE 510 may be set up to receive and process packets from the first Node B 502, and a second MAC entity at the UE 510 may be set up to receive and process packets from the second Node B 504.

At a suitable time before, during, or after establishment of the call, in block 1004 the UE 510 may receive RRC signaling indicating a current primary link identifier mapping. For example, the RRC layer at the RNC 518 may send queue IDs (QIDs) to the UE 510, including a QID for the primary serving cell (e.g., queue_id) and a QID for each of the one or more secondary serving cell(s) (e.g., queue_id_2). With this information, when the MAC entity at the UE 510 delivers a packet to the RLC entity, the MAC can determine if the packet arrived from the queue with the QID queue_id or queue_id_2, or some other QID, as described in further detail below.

In block 1006, the UE 510 may receive and queue at least one RLC control PDU from the primary serving cell. For example, the UE 510 may receive one or more downlink packets from the primary serving cell, wherein at least one of the downlink packets is a control packet. However, at this time, the packet is received and queued at the corresponding MAC entity, e.g., at the reordering entity 808 of a MAC-ehs entity corresponding to the primary serving cell, and the MAC entity may not have any indication as to whether the packet is an RLC control packet or not. Still, the MAC entity does have an indication of a MAC TSN for the packet and that the source of the packet corresponds to the primary serving cell, in accordance with the RRC signaling received at block 1004.

At this time, prior to delivering the control packet received in block 1006 to the RLC entity, i.e., while the control packet is queued at the MAC entity, in block 1008 the MAC entity at the UE 510 may detect a missing MAC TSN corresponding to a missing packet from the primary serving cell. In response, the MAC entity may start a reordering release timer (T1 timer) corresponding to the missing packet.

At block 1010, during the running of the T1 timer and prior to its expiration, a serving cell change may commence. For example, a measurement event corresponding to characteristics of one or more of the downlink transmissions from various cells may indicate that a different cell other than the one being utilized from the first Node B 502 may be preferable to act as the primary serving cell. In an example of an Event 1D measurement event, the second Node B 504 may be swapped with the first Node B 502 such that the second Node B 504 may act as the primary serving cell after the serving cell change. However, this is of course not a limiting possibility, and any of several types of serving cell change may take place to replace the first Node B 502 with some other cell as the primary serving cell.

In this example, at block 1012, before, during, or after the serving cell change of block 1010, the UE 510 may receive RRC signaling indicating a new current primary link identifier mapping. That is, following the serving cell change, a new cell may correspond to the primary link. Therefore, updated signaling may indicate to the UE 510 which cell acts as the new primary serving cell, so that the MAC entity at the UE 510 may determine whether a packet delivered to the RLC entity arrived from the new primary serving cell.

In block 1014, following the serving cell change, the T1 timer started in block 1008 may expire. Thus, the MAC entity at the UE 510 that detected the TSN gap indicating the missing packet, may determine that the missing packet is lost. Thus, as described above, the MAC entity at the UE 510 may discard any partial packets and deliver any complete packets to the RLC layer.

Thus, in block 1016, in accordance with an aspect of the present disclosure, a MAC entity at the UE 510 may insert an identifier into a MAC PDU indicating whether the packet arrived from the current primary serving cell and pass the packet including the identifier to the RLC layer. Here, the identifier may be determined in accordance with the RRC signaling received in block 1012 indicating the current primary link identifier mapping. Thus, in the scenario described above in relation to FIG. 9, if the queued packet and the T1 timer corresponded to the former primary serving cell, which is no longer the primary serving cell following the serving cell change in block 1010, the identifier will indicate that the packet did not arrive from the current primary serving cell. In this way, an identifier may be associated with each MAC TSN. In one example, the link identifier may include metadata associated with the PDU to indicate whether the PDU came from the primary link. Further, the link identifier may be inserted at the reordering entity 808 of a MAC-ehs entity 800, or by any suitable processor such as the processors 612 or 104, for example.

With this information and the packet, at block 1018, the RLC entity at the UE 510 may determine whether the packet is a control packet. If the packet is not a control packet, e.g., the packet is a data packet, then in block 1020 the UE 510 may process the data packet accordingly. That is, some aspects of the present disclosure may not alter the UE behavior based on whether or not a data packet arrived from the current primary serving cell. However, if the packet is a control packet, then in block 1022 the UE 510 may determine whether the packet arrived from the current primary serving cell. That is, based on the identifier inserted into the packet by the MAC entity at the UE 510 in block 1016, the RLC entity at the UE 510 may detect whether the packet arrived from the current primary serving cell. If yes, then in block 1024 the RLC entity may process the control packet as normal, knowing that the packet arrived from the current primary serving cell. If no, then in block 1026 the RLC entity may discard the control packet, since it arrived from a cell that is not the current primary serving cell. In this way, an RLC reset that might otherwise be caused from processing an RLC control packet that arrived from other than the current primary serving cell can be avoided.

Thus, in accordance with an aspect of the present disclosure, when a MAC entity at the UE 510 delivers a packet to the RLC entity, the delivered packet can include an indication as to whether the packet arrived from the serving cell that is currently the primary serving cell. With this information, the RLC layer can discard any control packets that did not arrive from the current primary serving cell, avoiding the need for the RLC reset based on the out-of-order control packet processing.

In another aspect of the disclosure, rather than modifying the MAC behavior to insert the current primary serving cell identifier into a packet, the serving cell change procedure at the UE 510 may be modified such that out-of-order control packets are not delivered to the RLC layer.

Figure 11:
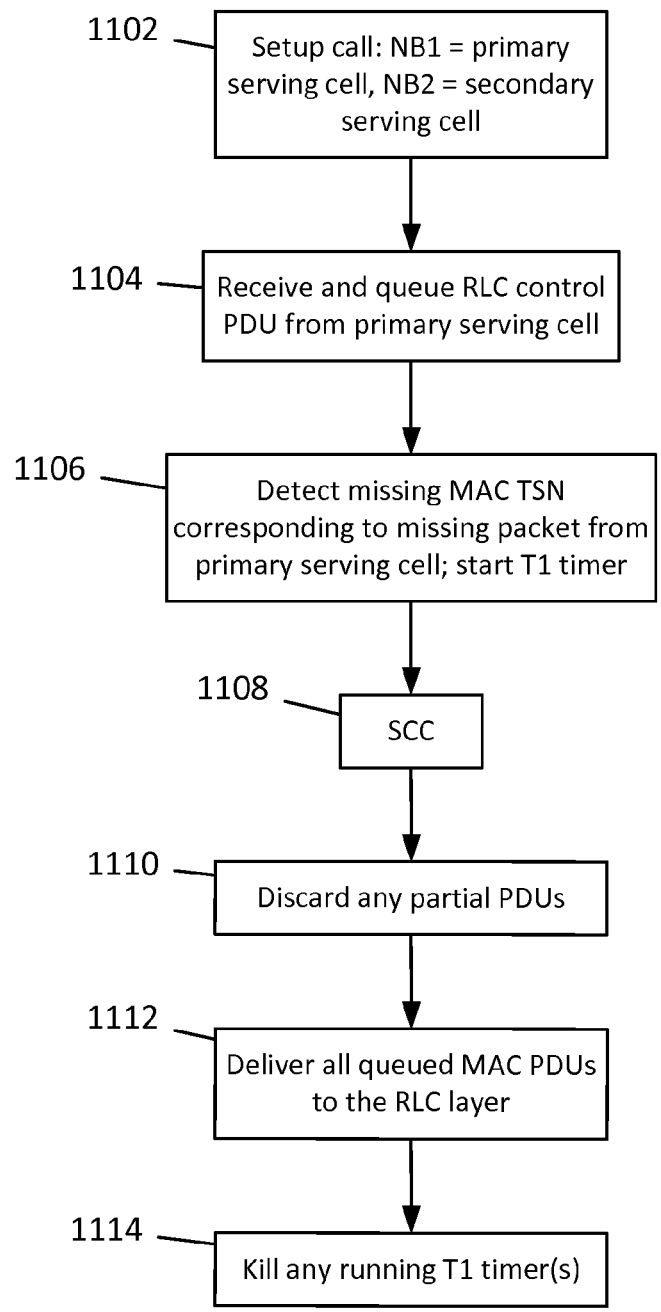
FIG. 11 is a flow chart illustrating an exemplary process for flushing a MAC queue during a serving cell change.

FIG. 11 is a flow chart illustrating an exemplary process operable at a UE such as the UE 510 in accordance with this aspect of the disclosure. As in the process described above in relation to FIG. 10, here, in blocks 1102, 1104, and 1106, the UE 510 may set up a multi-point HSDPA call with the network utilizing the first Node B 502 as the primary serving cell and the second Node B 504 as the secondary serving cell, receiving and queuing an RLC control PDU sent from the primary serving cell, and detecting a missing MAC TSN corresponding to a missing packet from the primary serving cell. Again, a corresponding T1 timer may be started in accordance with the missing packet.

In block 1108, a serving cell change may trigger, wherein the cell acting as the primary serving cell may change. In one nonlimiting example, an Event 1D may occur, wherein the first Node B 502 and the second Node B 504 may swap places such that the second Node B 504 acts as the new primary serving cell and the first Node B 502 acts as the new secondary serving cell.

Here, in accordance with an aspect of the present disclosure, at block 1110 the MAC layer at the UE 510 may discard any partial PDUs. That is, any MAC PDU indicating that it is only a part of an upper layer packet, wherein at least one packet corresponding to the remaining portion of that partial packet has not been properly received and decoded at the MAC entity, may be discarded. In block 1112, all non-partial, e.g., complete packets queued at the MAC entity of the UE 510 may be passed up to the RLC layer. In this fashion, by discarding all partial PDUs and delivering all queued PDUs to the RLC layer, the MAC queue may essentially be flushed at the time of the serving cell change. Therefore, any later delivery of control packets that arrived from a cell that is no longer the primary serving cell following the serving cell change may be reduced or avoided, thus avoiding the RLC reset issue. Further, because the queue at the MAC layer has been flushed, in block 1114 any running T1 timer or timers at the MAC layer may be killed. For example, killing a timer may include stopping the timer, and resetting a value corresponding to the timer to a suitable initial value.

In this way, there may be a nonzero loss of data at a serving cell change, which might not otherwise occur. That is, there is a probability that at least one packet in transit over what was formerly the primary serving cell would have arrived and been properly processed at the UE 510 had the discarding of partial packets in block 1110 not occurred. However, such a potential loss in data may be considered to be favorable in comparison to the possibility of undergoing an RLC reset procedure when out-of-order control RLC PDUs are delivered following the serving cell change.

Thus, following the serving cell change, the RLC layer at the UE 510 will receive RLC control PDUs only on the new, primary link, thus reducing or avoiding the RLC reset.

In another aspect of the present disclosure, following a serving cell change, the delivery of packets from the MAC layer corresponding to the new primary serving cell to the RLC layer may be delayed according to the time of a T1 timer. In another example, while the delivery from the MAC layer to the RLC layer may not necessarily be delayed, processing of the packet at the RLC layer may be delayed according to the time of the T1 timer. In this way, out-of-order processing of control packets as described in the scenario of FIG. 9 can be reduced or avoided by preventing the immediate processing of control packets from the new primary serving cell following the serving cell change, and instead waiting for the time of the T1 timer. Thus, any queued control packets from the previous primary serving cell can be delivered to the RLC layer at the expiration of a running T1 timer, and processed accordingly.

In a further aspect of the disclosure, this delay in processing control packets from the new primary serving cell may only apply in a case where it is known that there are undelivered control packets from the previous primary serving cell.

Figure 12:
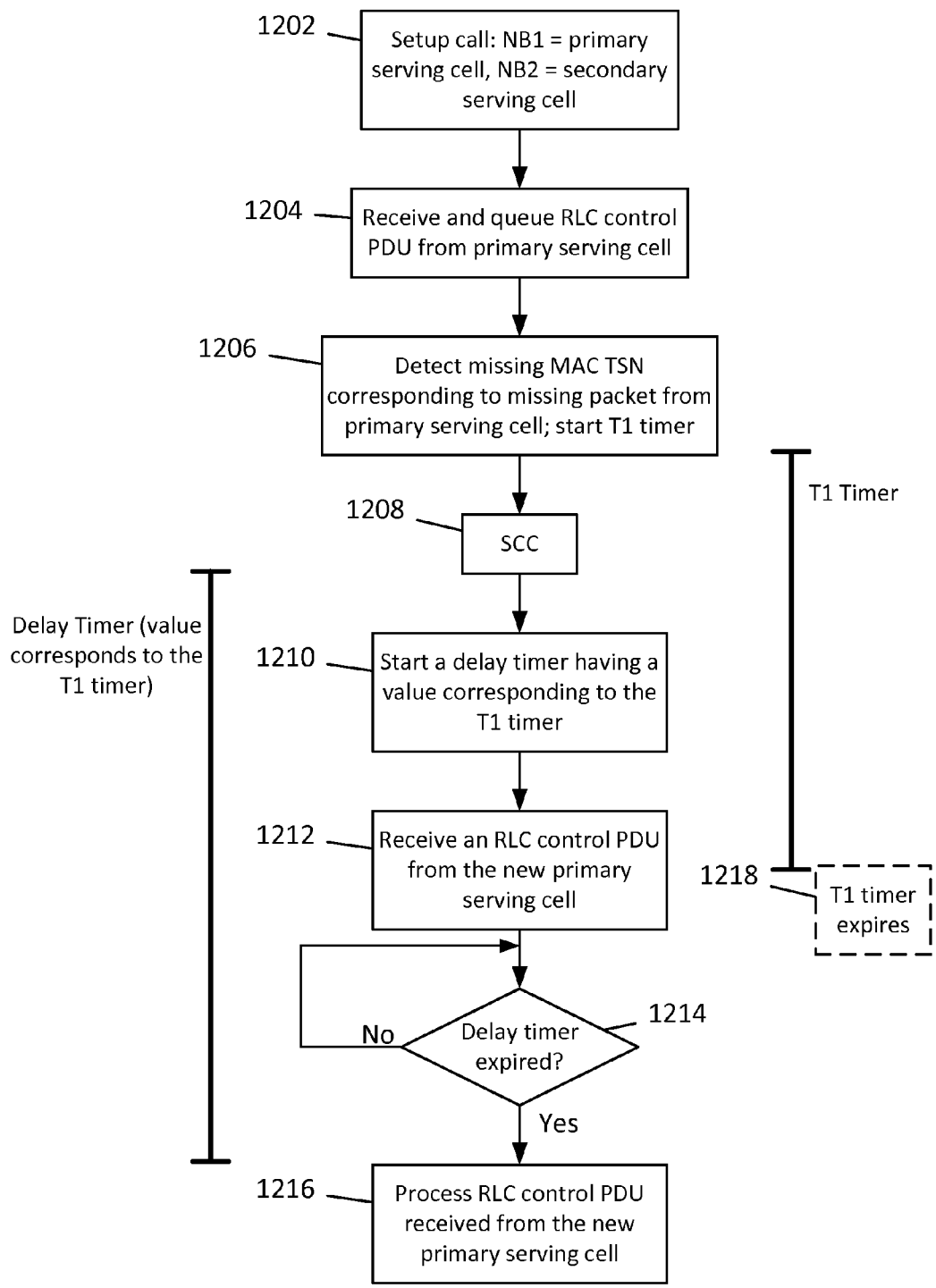
FIG. 12 is a flow chart illustrating an exemplary process for delaying processing of control packets following a serving cell change.

FIG. 12 is a flow chart illustrating a process 1200 in accordance with an aspect of the present disclosure utilizing a delay following a serving cell change as described above. That is, in block 1202, the process may set up a multi-point HSDPA call with the network utilizing the first Node B 502 as the primary serving cell and the second Node B 504 as a secondary serving cell. In block 1204, the process may receive and queue an RLC control PDU sent from the primary serving cell. In block 1206, the process may detect a missing MAC TSN corresponding to a missing packet from the primary serving cell. Again, a corresponding T1 timer may be started in accordance with the detected missing packet.

In block 1208, a serving cell change may trigger, wherein the cell acting as the primary serving cell may change. In one nonlimiting example, an Event 1D may occur, wherein the first Node B 502 and the second Node B 504 may swap places such that the second Node B 504 acts as the new primary serving cell and the first Node B 502 acts as the new secondary serving cell.

Here, in accordance with an aspect of the present disclosure, in block 1210 the UE 510 may start a delay timer having a value corresponding to the value of the T1 timer. This delay timer may be utilized to delay the processing of packets, e.g., RLC control PDUs, for a time corresponding to the value of the T1 timer, following the serving cell change. The time may be the same as the T1 timer, or greater than the T1 timer, or even less than the T1 timer, as long as it can be determined that the processing of any control packet from the new primary serving cell is delayed until any running T1 timer corresponding to the previous primary serving cell expires.

That is, in block 1212, the UE 510 may receive an RLC control PDU from the new primary serving cell following the serving cell change of block 1208. However, the processing of the control packet may be delayed. That is, in block 1214, the process may wait until the delay timer, having the value corresponding to the value of the T1 timer, started in block 1210, is expired.

Meanwhile, in block 1218, at some point prior to the expiration of the delay timer, the T1 timer started in block 1206 may expire. At this time, as described above, any complete queued packets at the corresponding MAC entity may be delivered to the RLC layer, and any control packets may thereby be processed at the RLC entity.

After the delay timer expires in block 1214, in block 1216, the RLC layer may process the control packet received from the new primary serving cell. Here, because the prior control packet from the previous primary serving cell was already processed as described above in relation to block 1218, the processing of the control packet in block 1216 is not out-of-order, and the RLC reset can be avoided.

In some aspects of the disclosure, the delay timer may exist at the MAC layer, and the corresponding MAC entity may delay the delivery of the packet to the RLC layer until the expiration of the delay timer. In other aspects of the disclosure, the delay timer may exist at the RLC layer, such that the corresponding MAC entity may deliver the packet normally, however, the RLC layer may delay the processing of the packet until the expiration of the delay timer.

Further, in some aspects of the disclosure, the use of the delay timer started in block 1210 may be dependent on whether there exist undelivered control packets from the previous primary serving cell. For example, if a T1 timer is not running at the MAC entity corresponding to the previous primary serving cell, the delay timer may not be utilized and control packets received from the new primary serving cell following the serving cell change may be processed normally. As another example, even if a T1 timer is running at the MAC entity corresponding to the previous primary serving cell, if it can be determined that there are no queued RLC control packets at that MAC entity, then the delay timer may not be utilized and control packets received from the new primary serving cell following the serving cell change may be processed normally.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication operable at an access terminal, comprising:
   receiving a packet at a medium access control (MAC) entity from a first serving cell;
   delivering the packet to a radio link control (RLC) layer;

inserting an identifier into the packet, the identifier adapted to indicate whether the first serving cell is a current primary serving cell at the time of the delivering of the packet to the RLC layer;

determining at the RLC layer that the packet is a control packet;

determining at the RLC layer that the serving cell is not the primary serving cell; and discarding the control packet.

2. The method of claim 1, further comprising:

determining at the MAC entity whether the packet was received from the current primary serving cell at the time of the delivering of the packet to the RLC layer.

3. The method of claim 1, further comprising:

receiving control signaling for mapping a current primary serving cell to a first base station.

4. The method of claim 3, wherein the control signaling comprises radio resource control (RRC) signaling provided by a radio network controller (RNC).

5. An access terminal for wireless communication, comprising:

a radio link control (RLC) entity for processing an RLC packet; and a first medium access control (MAC) entity for receiving a first downlink channel comprising a plurality of MAC packets, reordering the plurality of MAC packets to form the RLC packet, and delivering the RLC packet to the RLC entity, wherein the first MAC entity is configured to insert into the delivered RLC packet an identifier indicating whether the delivered RLC packet arrived from a serving cell that is a primary serving cell at the time of the delivering the RLC packet to the RLC entity, and wherein the RLC entity is configured to determine that the RLC packet is a control packet, determine that the serving cell is not the primary serving cell, and discard the control packet.

6. The access terminal of claim 5, further comprising:

a second MAC entity for receiving a second downlink channel, wherein the first downlink channel and the second downlink channel are transmitted wirelessly utilizing the same carrier frequency.

7. An access terminal configured for wireless communication, comprising:

at least one processor;

a receiver coupled to the at least one processor for receiving a downlink transmission; and a memory coupled to the at least one processor, wherein the at least one processor is configured to:

receive a packet at a medium access control (MAC) entity from a first serving cell;

deliver the packet to a radio link control (RLC) layer;

insert an identifier into the packet, the identifier adapted to indicate whether the first serving cell is a current primary serving cell at the time of the delivering of the packet to the RLC layer;

determine at the RLC layer that the packet is a control packet;

determine at the RLC layer that the serving cell is not the primary serving cell; and discard the control packet.

8. The access terminal of claim 7, wherein the at least one processor is further configured to:

determine at the MAC entity whether the packet was received from the current primary serving cell at the time of the delivering of the packet to the RLC layer.

9. The access terminal of claim 7, wherein the at least one processor is further configured to:

receive control signaling for mapping a current primary serving cell to a first base station.

10. The access terminal of claim 9, wherein the control signaling comprises radio resource control (RRC) signaling provided by a radio network controller (RNC).

11. An access terminal configured for wireless communication, comprising:

means for receiving a packet at a medium access control (MAC) entity from a first serving cell;

means for delivering the packet to a radio link control (RLC) layer;

means for inserting an identifier into the packet, the identifier adapted to indicate whether the first serving cell is a current primary serving cell at the time of the delivering of the packet to the RLC layer;

means for determining at the RLC layer that the packet is a control packet;

means for determining at the RLC layer that the serving cell is not the primary serving cell; and means for discarding the control packet.

12. A computer program product operable at an access terminal, comprising:

a non-transitory computer-readable medium comprising:

instructions for causing a computer to receive a packet at a medium access control (MAC) entity from a first serving cell;

instructions for causing a computer to deliver the packet to a radio link control (RLC) layer;

instructions for causing a computer to insert an identifier into the packet, the identifier adapted to indicate whether the first serving cell is a current primary serving cell at the time of the delivering of the packet to the RLC layer;

instructions for causing a computer to determine at the RLC layer that the packet is a control packet;

instructions for causing a computer to determine at the RLC layer that the serving cell is not the primary serving cell; and instructions for causing a computer to discard the control packet.

* * * * *